United States Patent
Yata et al.

(10) Patent No.: US 10,578,866 B2
(45) Date of Patent: *Mar. 3, 2020

(54) HEAD UP DISPLAY DEVICE WITH A POLARIZATION SEPARATION ELEMENT

(71) Applicant: Japan Display Inc., Tokyo (JP)

(72) Inventors: Tatsuya Yata, Tokyo (JP); Naoyuki Takasaki, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/267,703

(22) Filed: Feb. 5, 2019

(65) Prior Publication Data

US 2019/0171009 A1 Jun. 6, 2019

Related U.S. Application Data

(63) Continuation of application No. 15/797,717, filed on Oct. 30, 2017, now Pat. No. 10,254,541.

(30) Foreign Application Priority Data

Oct. 31, 2016 (JP) .................. 2016-213043

(51) Int. Cl.
*G02B 27/01* (2006.01)
*G09G 3/00* (2006.01)
(Continued)

(52) U.S. Cl.
CPC ....... *G02B 27/0101* (2013.01); *G02B 27/283* (2013.01); *G02F 1/0136* (2013.01); *G02F 1/137* (2013.01); *G02F 1/1368* (2013.01); *G02F 1/133528* (2013.01); *G03B 21/28* (2013.01); *G09G 3/002* (2013.01); *G09G 3/3406* (2013.01); *G02B 5/3083* (2013.01);
(Continued)

(58) Field of Classification Search
CPC .............. G03B 21/005; G03B 21/0056; G03B 21/2013; G03B 21/2033; G03B 21/2066; G03B 21/2073; H04N 9/315; H04N 9/317; H04N 9/3111; H04N 9/3167; H04N 9/3197
See application file for complete search history.

(56) References Cited

U.S. PATENT DOCUMENTS 7,656,585 B1 2/2010 Powell et al.
7,878,656 B2 2/2011 Hsu et al.
(Continued)

FOREIGN PATENT DOCUMENTS

JP 11-14394 A 1/1999
JP 11-14398 A 1/1999
JP 2014-126716 A 7/2014

*Primary Examiner* — Sultan Chowdhury
(74) *Attorney, Agent, or Firm* — Michael Best & Friedrich LLP

(57) ABSTRACT

According to one embodiment, a display device includes a polarization separation element which transmits first polarized light, and reflects second polarized light, a first optical modulation unit which displays a first image by using transmitted light, a second optical modulation unit which displays a second image by using reflected light, and a projector which projects the first image onto a first projection area of a projection plane, and projects the second image onto a second projection area different from the first projection area of the projection plane.

20 Claims, 21 Drawing Sheets

(51) Int. Cl.
   *G02B 27/28* (2006.01)
   *G02F 1/01* (2006.01)
   *G02F 1/1335* (2006.01)
   *G02F 1/1368* (2006.01)
   *G02F 1/137* (2006.01)
   *G03B 21/28* (2006.01)
   *G09G 3/34* (2006.01)
   *G02F 1/1362* (2006.01)
   *G02B 5/30* (2006.01)

(52) U.S. Cl.
   CPC ............ *G02B 2027/014* (2013.01); *G02B 2027/0118* (2013.01); *G02F 1/1362* (2013.01); *G02F 2203/01* (2013.01); *G02F 2203/12* (2013.01); *G09G 2320/041* (2013.01); *G09G 2320/0646* (2013.01); *G09G 2320/0686* (2013.01); *G09G 2330/045* (2013.01); *G09G 2380/10* (2013.01)

(56) References Cited

U.S. PATENT DOCUMENTS

| | | |
|---|---|---|
| 2004/0032569 A1* | 2/2004 | Takezawa ............ G02B 7/008 353/31 |
| 2006/0028620 A1 | 2/2006 | Conner |
| 2007/0195272 A1* | 8/2007 | Hendrix ............... G02B 5/3083 353/20 |
| 2009/0009594 A1 | 1/2009 | Kawai |
| 2009/0091709 A1 | 4/2009 | Chien et al. |
| 2009/0262066 A1 | 10/2009 | Oke et al. |
| 2010/0171938 A1 | 7/2010 | Amano |
| 2011/0164221 A1 | 7/2011 | Tilleman et al. |
| 2011/0176120 A1 | 7/2011 | Geissler et al. |
| 2012/0057084 A1 | 3/2012 | Sano et al. |
| 2012/0170000 A1 | 7/2012 | Imaoka et al. |
| 2012/0200830 A1 | 8/2012 | Yanai et al. |
| 2012/0206697 A1* | 8/2012 | Lee .................... G03B 21/14 353/82 |
| 2013/0050593 A1* | 2/2013 | Fujikawa ........... G02B 27/0101 349/9 |
| 2013/0241810 A1 | 9/2013 | Higashi et al. |
| 2014/0176862 A1 | 6/2014 | Uehara |
| 2014/0218386 A1 | 8/2014 | Tatsuno et al. |
| 2015/0364094 A1 | 12/2015 | Takasaki et al. |
| 2015/0379498 A1 | 12/2015 | Baldwin et al. |
| 2016/0035289 A1 | 2/2016 | Inada et al. |
| 2016/0379498 A1 | 12/2016 | Aoki |
| 2017/0293156 A1* | 10/2017 | Saracco ............... G02B 5/3083 |

* cited by examiner

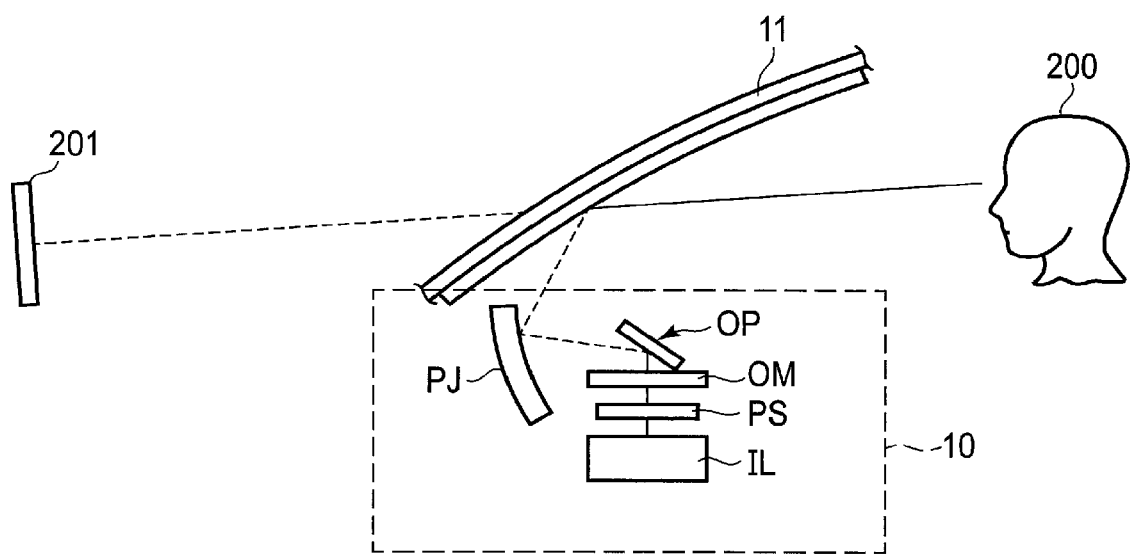
F I G. 1

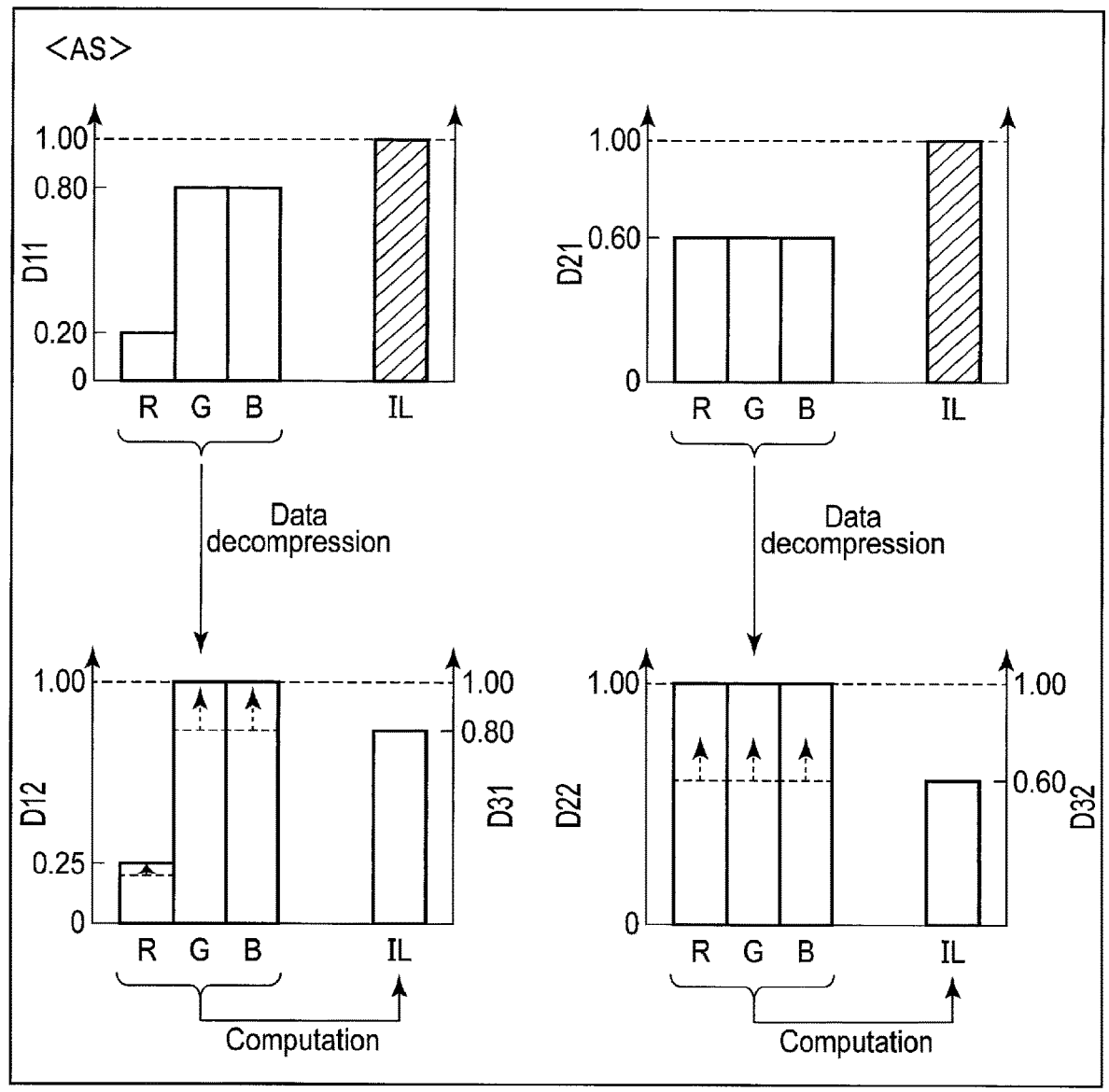
F I G. 11

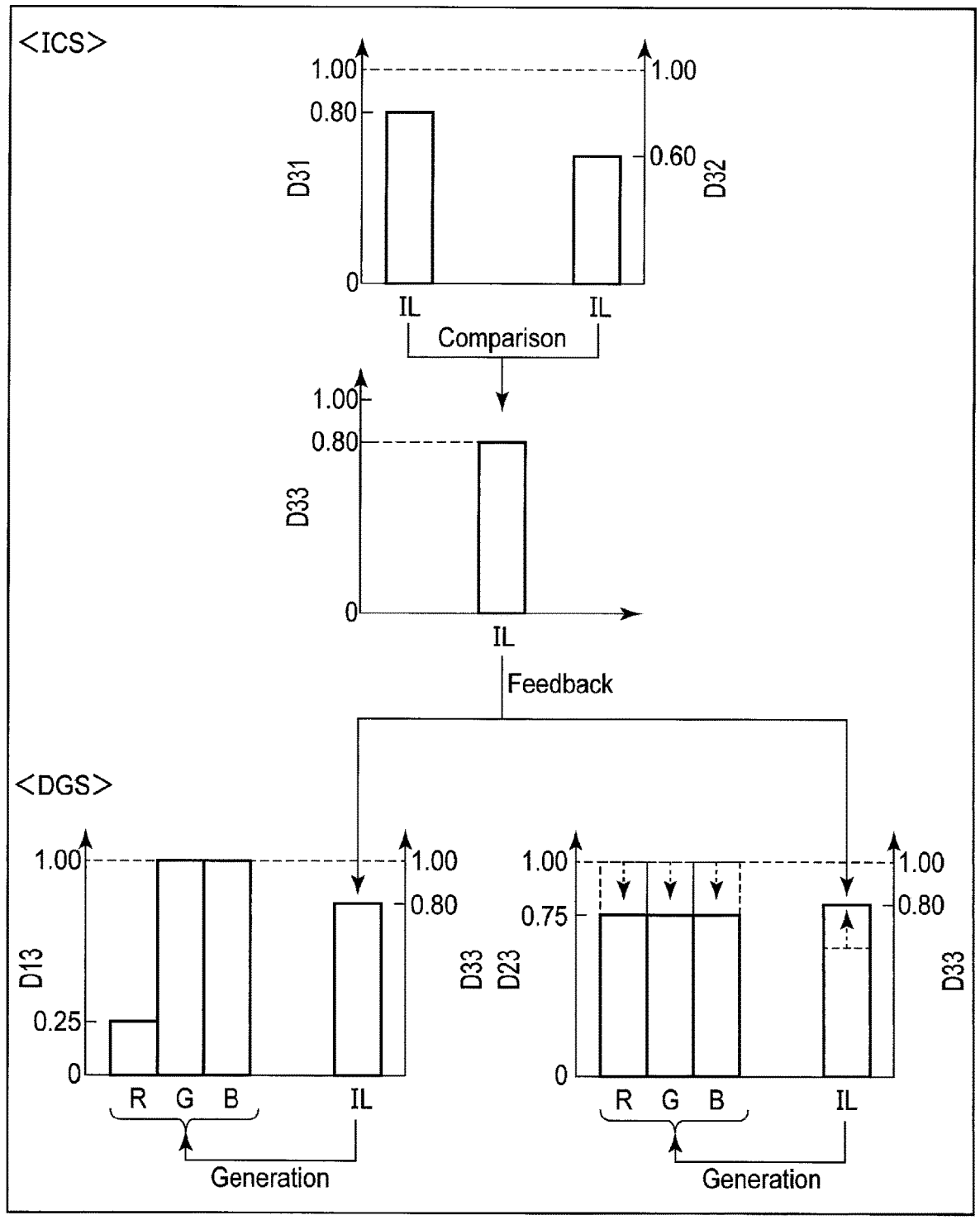
F I G. 12

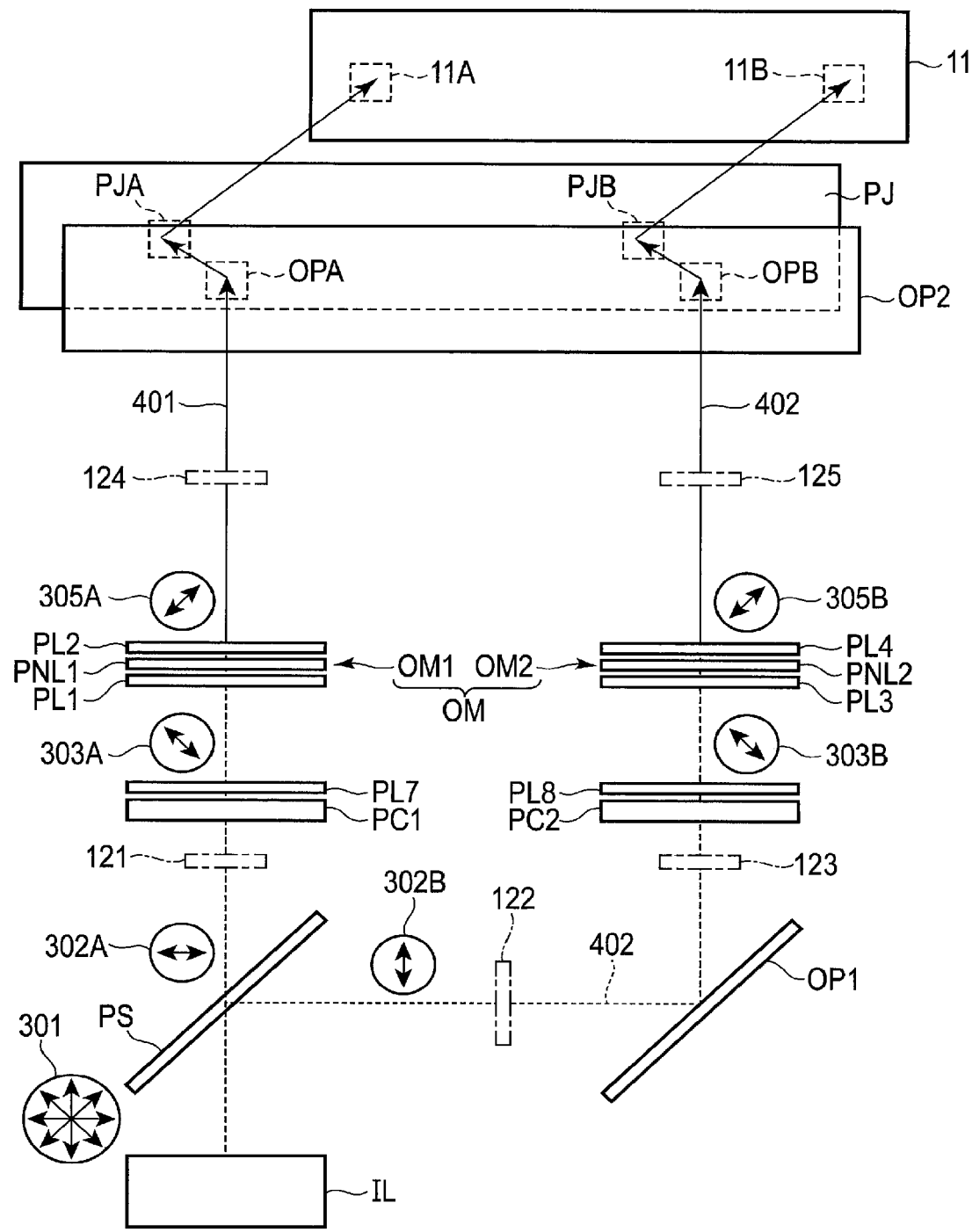
F I G. 15A

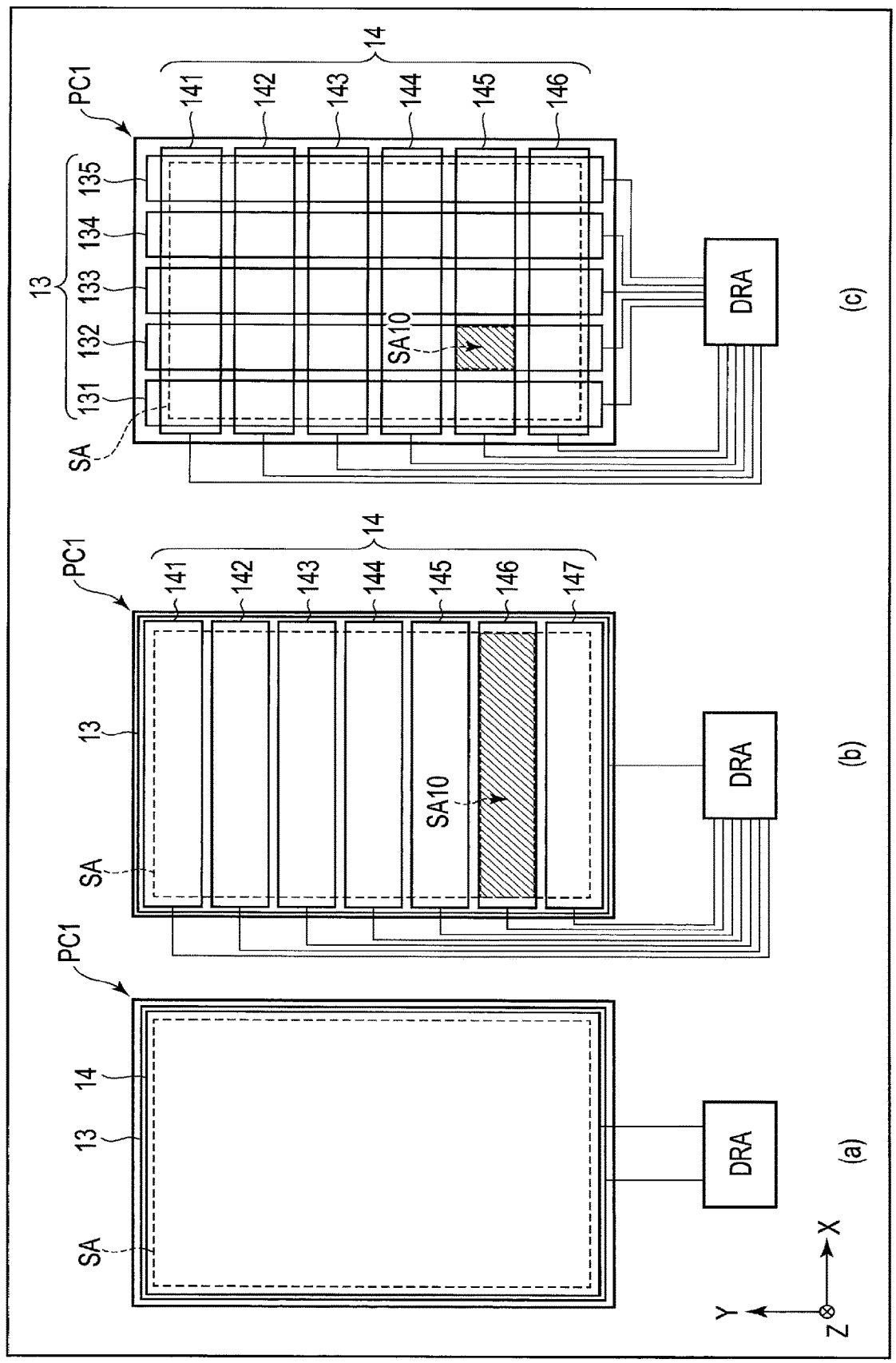
F I G. 17

HEAD UP DISPLAY DEVICE WITH A POLARIZATION SEPARATION ELEMENT

CROSS-REFERENCE TO RELATED APPLICATIONS

This application is a Continuation Application of patent application Ser. No. 15/797,717, filed Oct. 30, 2017, which is based upon and claims the benefit of priority from Japanese Patent Application No. 2016-213043, filed Oct. 31, 2016, the entire contents of which are incorporated herein by reference.

FIELD

Embodiments described herein relate generally to a display device.

BACKGROUND

As one of the display devices, a head-up display (which may be referred to as a HUD in the following) has been developed. In the HUD, an image displayed on a display panel is projected onto a windshield via a mirror. The projected image is visually recognized as a virtual image ahead of the windshield by an observer. The display panel to be applied in this projection displays an image by selectively transmitting light from a light source located at the back of the display panel, for example.

In the HUDs available recently, displaying various images at different positions is desired. If the size of the display panel is simply increased, the size of the light source for illuminating this display panel is also increased, which may cause an amount of generation of heat in the light source to be increased. Also, due to entry of external light in a unit of an optical system, the temperature in the unit may be increased. In addition, luminance of a virtual image is low as a result of a reflectance of a projection plane (for example, the windshield) being low. Therefore, if the brightness of the light source is enhanced in order to improve the visibility of the virtual image, the amount of heat generation of the light source may be increased. Such generation of heat by the HUD causes the optical system in the unit to be deformed, or the temperature of the space in which the HUD is mounted to be increased. Accordingly, a demand for suppressing the heat generation as much as possible is to be met. Also, making this type of HUD as small as possible structurally is demanded.

BRIEF DESCRIPTION OF THE DRAWINGS

FIG. 1 is an illustration showing a basic structure of a display device 10 of the present embodiment in principle.

FIG. 11 is an illustration showing one example of data processing in a computation module AS.

FIG. 12 is an illustration showing one example of data processing in an illumination controller ICS and a data generator DGS.

FIG. 13 is an illustration showing one example of data processing in a converter TS and the computation module AS.

FIG. 15A is an illustration showing a modification of the display device 10 comprising a first polarization controller PC1 and a second polarization controller PC2.

FIG. 17 is a plan view showing a configuration example of the first polarization controller PC1.

DETAILED DESCRIPTION

Figure 2:
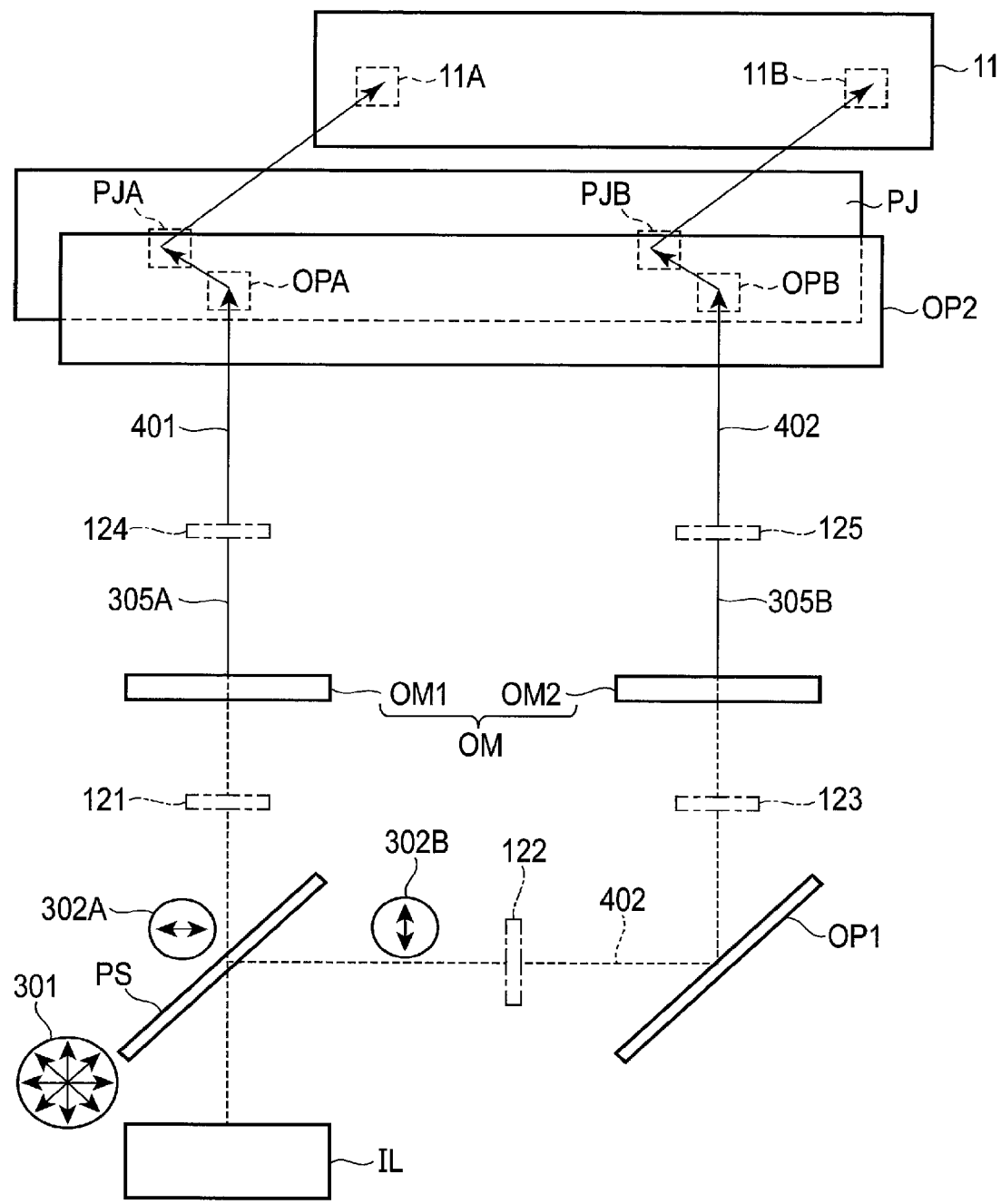
FIG. 2 is an illustration for explaining an optical path in the display device 10 shown in FIG. 1.

In general, according to one embodiment, a display device includes: an illumination device; a polarization separation element which transmits first polarized light as transmitted light, and reflects second polarized light different from the first polarized light as reflected light, the first polarized light and the second polarized light being part of illumination light from the illumination device; a first optical modulation unit which displays a first image by using the transmitted light, which is the light transmitted through the polarization separation element; a second optical modulation unit which displays a second image by using the reflected light, which is the light reflected by the polarization separation element;

and a projector which projects the first image onto a first projection area of a projection plane, and projects the second image onto a second projection area different from the first projection area of the projection plane.

Embodiments will be described hereinafter with reference to the accompanying drawings. The disclosure is merely an example, and proper changes within the spirit of the invention, which are easily conceivable by a skilled person, are included in the scope of the invention as a matter of course. In addition, in some cases, in order to make the description clearer, the widths, thicknesses, shapes, etc., of the respective parts are illustrated in the drawings schematically, rather than as an accurate representation of what is implemented. However, such schematic illustration is merely exemplary, and in no way restricts the interpretation of the invention. In addition, in the specification and drawings, structural elements which function in the same or a similar manner to those described in connection with preceding drawings are denoted by like reference numbers, and redundant detailed description thereof is omitted unless necessary.

FIG. 1 is an illustration showing a basic structure of a display device 10 of the present embodiment in principle.

The display device 10 of the illustrated example is a head-up display which uses a windshield of a vehicle, etc., as a projection plane (a screen) 11 for projection. Note that the projection plane 11 is not limited to a windshield, and other combiners may be used.

The display device 10 comprises an illumination device IL, a polarization separation element PS, an optical modulation element OM, an optical system OP, and a projector PJ.

As will be described later, the illumination device IL comprises a plurality of light sources, and illuminates the optical modulation element OM.

The polarization separation element PS transmits first polarized light emitted from the illumination device IL, and reflects second polarized light. As such a polarization separation element PS, a plate-like or cube-like polarization beam splitter, for example, can be applied.

As will be described later, the optical modulation element OM includes two optical modulation units. In the example illustrated, the optical modulation element OM is a transmissive element which displays an image by selectively transmitting illumination light from the illumination device IL. The illumination light includes transmitted light (first polarized light), which is the light transmitted through the polarization separation element PS, and reflected light (second polarized light), which is the light reflected by the polarization separation element PS. Note that the optical modulation element OM may be a reflective element which displays an image by selectively reflecting the illumination light from the illumination device IL, in which case, the illumination device IL is located at a front side of the optical modulation element OM. As the optical modulation element OM, a transmissive or reflective liquid crystal device, microelectromechanical systems (MEMS) such as a digital micromirror device (DMD), or the like, can be applied.

The optical system OP includes a mirror which guides light transmitted through the optical modulation element OM to the projector PJ.

The projector PJ projects the light guided by the optical system OP onto the projection plane 11. A concave mirror, for example, can be applied to such a projector PJ.

A user 200 who uses the display device 10 can visually recognize a virtual image 201 ahead of the projection plane 11.

FIG. 2 is an illustration for explaining an optical path in the display device 10 shown in FIG. 1.

Each of a first optical path 401 and a second optical path 402 in the drawing represents an optical path from the polarization separation element PS to the projection plane 11. The first optical path 401 corresponds to an optical path of transmitted light 302A and a first image 305A, and the second optical path 402 corresponds to an optical path of reflected light 302B and a second image 305B.

Illumination light 301 radiated from the illumination device IL is, for example, natural light, and has random oscillation planes. The illumination light 301 enters the polarization separation element PS. The polarization separation element PS transmits the transmitted light 302A corresponding to the first polarized light of the illumination light 301, and reflects the reflected light 302B corresponding to the second polarized light of the illumination light 301. The reflected light 302B is reflected by a mirror OP1, which is one element of the optical system OP, and is guided to a second optical modulation unit OM2. The first polarized light is linearly polarized light having a predetermined oscillation plane, and is, for example, p-polarized light. The second polarized light is linearly polarized light intersecting the first polarized light, and is, for example, s-polarized light. More specifically, the second polarized light is orthogonal to the first polarized light.

The optical modulation element OM includes a first optical modulation unit OM1 disposed in the first optical path 401, and the second optical modulation unit OM2 disposed in the second optical path 402, between the polarization separation element PS and the projector PJ. The first optical modulation unit OM1 is illuminated evenly by the transmitted light 302A from the back. The first optical modulation unit OM1 displays the first image 305A by using the transmitted light 302A, which is the light transmitted through the polarization separation element PS. Also, the second optical modulation unit OM2 is illuminated evenly by the reflected light 302B from the back. The second optical modulation unit OM2 displays the second image 305B by using the reflected light 302B, which is the light reflected by the polarization separation element PS.

The first image 305A corresponds to light which represent a first optical image 12A. The second image 305B corresponds to light which represent a second optical image 12B. In one example, the first image 305A is the second polarized light, and the second image 305B is the first polarized light. In other words, the illumination light 301 is separated into the transmitted light 302A and the reflected light 302B by the polarization separation element PS. The transmitted light 302A is modulated into the first image 305A by the first optical modulation element OM1. The reflected light 302B is modulated into the second image 305B. The first optical modulation unit OM1 and the second optical modulation unit OM2 are arranged separately in the example illustrated. However, as will be described later, the first optical modulation unit OM1 and the second optical modulation unit OM2 may be constituted by separate display panels, respectively, or the first optical modulation unit OM1 and the second optical modulation unit OM2 may be constituted by a single display panel.

In the example illustrated, the transmitted light 302A that exists when entering the first optical modulation unit OM1 corresponds to the first polarized light, and the reflected light 302B that exists when entering the second optical modulation unit OM2 corresponds to the second polarized light. However, the polarization of light is not limited to the above. For example, a retardation plate may be arranged in at least one point of a first position 121 in the first optical path 401, and a second position 122 and a third position 123 in the second optical path 402, between the polarization separation element PS and the first optical modulation unit OM1, and between the polarization separation element PS and the second optical modulation unit OM2. The second position 122 is between the polarization separation element PS and the mirror OP1. The third position 123 is between the mirror OP1 and the second optical modulation unit OM2.

The retardation plate arranged in at least one of the first position 121 to the third position 123 imparts retardation to at least one of the transmitted light 302A and the reflected light 302B. When a retardation plate which imparts a retardation of $\lambda/4$ is arranged at one point in the first optical path 401, and one point in the second optical path 402, retardations are imparted to the transmitted light 302A, which is the first polarized light, and the reflected light 302B, which is the second polarized light, in the first optical path 401 and the second optical path 402, respectively, and the transmitted light 302A and the reflected light 302B are converted into circularly polarized light. Further, when a retardation plate which imparts a retardation of $\lambda/2$ is arranged at one point in the first optical path 401, the transmitted light 302A is converted into the second polarized light, and the oscillation plane of light entering the first optical modulation unit OM1 can be made to conform to that of light entering the second optical modulation unit OM2.

Such a retardation plate may be arranged in at least one of a fourth position 124 in the first optical path 401 and a fifth position 125 in the second optical path 402, between the first optical modulation unit OM1 and the projector PJ, and between the second optical modulation unit OM2 and the projector PJ. The retardation plate arranged in at least one of the fourth position 124 and the fifth position 125 imparts retardation to at least one of the first image 305A and the second image 305B. According to the display device 10 in which the retardation plate is arranged in at least one of the first position 121 to the fifth position 125, for example, a user who uses polarized glasses can visually recognize either type of light since the first image 305A and the second image 305B are both converted into polarized light whose oscillation plane is nonparallel to an absorption axis of the polarized glasses, or circularly polarized light.

The first image 305A and the second image 305B are guided to the projector PJ by a mirror OP2, which is one element of the optical system OP. In the mirror OP2, the first image 305A is guided to a first area OPA, and the second image 305B is guided to a second area OPB different from the first area OPA. The mirror OP2 reflects each of the first image 305A and the second image 305B toward the projector PJ. In the projector PJ, the first image 305A is guided to a first area PJA, and the second image 305B is guided to a second area PJB different from the first area PJA. The projector PJ projects the first image 305A and the second image 305B onto different areas of the projection plane 11. On the projection plane 11, the first image 305A is projected onto a first projection area 11A, and the second image 305B is projected onto a second projection area 11B different from the first projection area 11A. Each of the first image 305A (the first optical image) projected onto the first projection area 11A, and the second image 305B (the second optical image) projected onto the second projection area 11B is visually recognized as a virtual image ahead of the projection plane 11 from the user 200, as shown in FIG. 1.

Figure 3A:
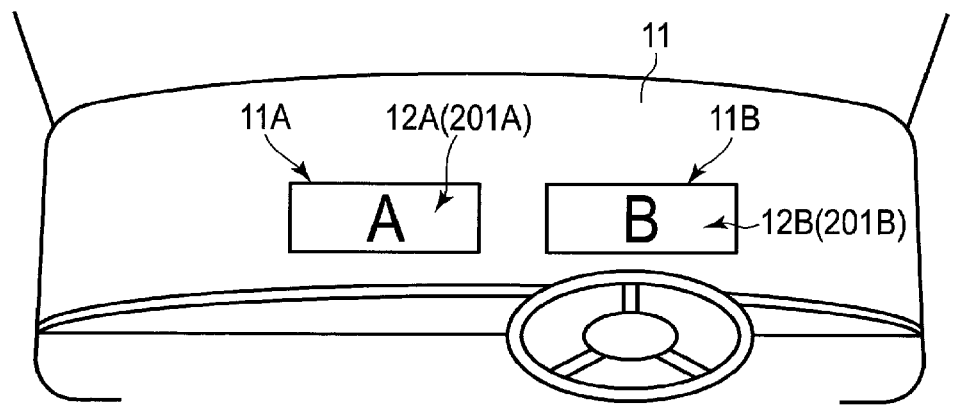
FIG. 3A is an illustration showing a display state of an optical image visually recognized by the display device 10 of the present embodiment.
Figure 3B:
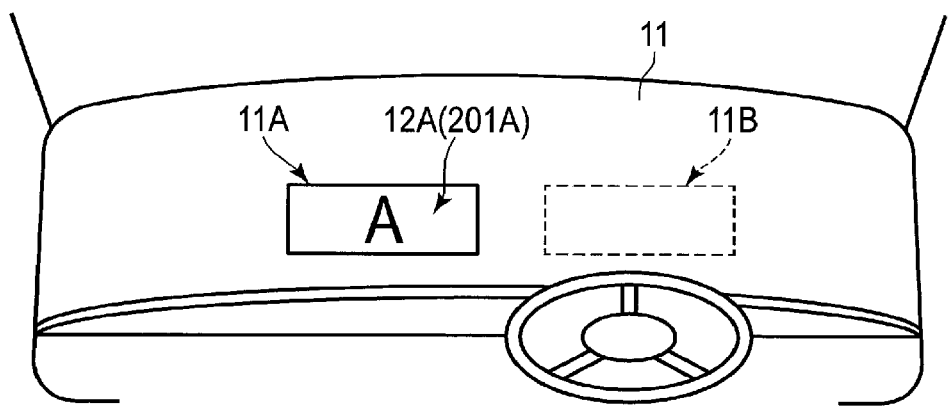
FIG. 3B is an illustration showing the display state of the optical image visually recognized by the display device 10 of the present embodiment.
Figure 3C:
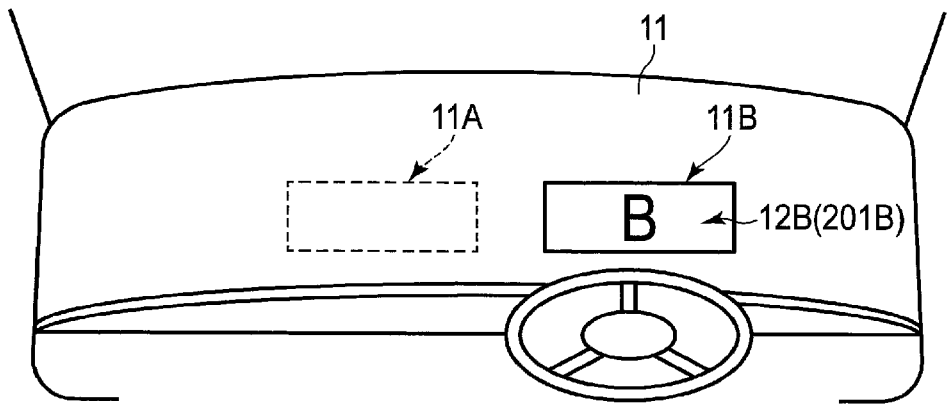
FIG. 3C is an illustration showing the display state of the optical image visually recognized by the display device 10 of the present embodiment.
Figure 3D:
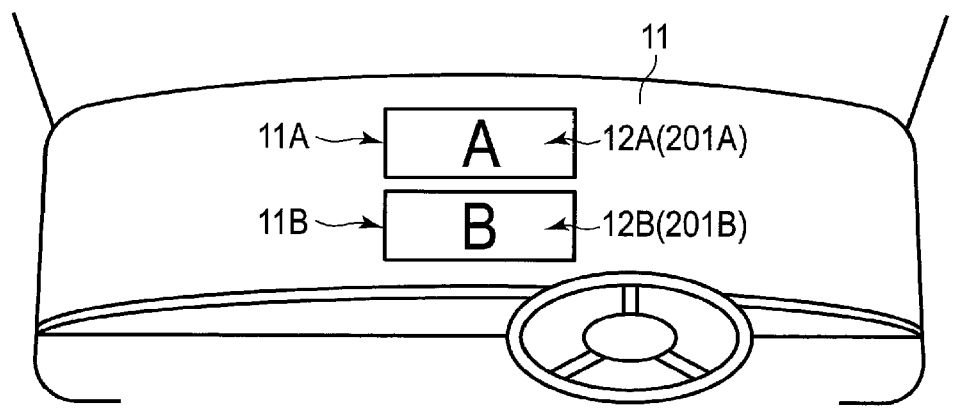
FIG. 3D is an illustration showing the display state of the optical image visually recognized by the display device 10 of the present embodiment.
Figure 3E:
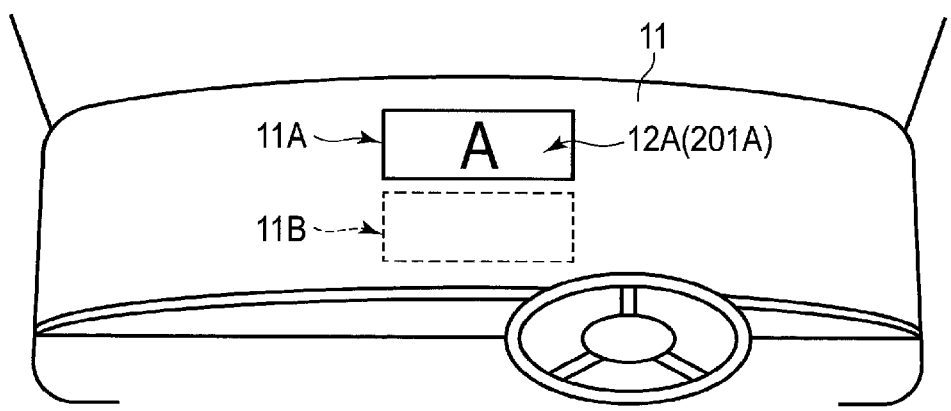
FIG. 3E is an illustration showing the display state of the optical image visually recognized by the display device 10 of the present embodiment.
Figure 3F:
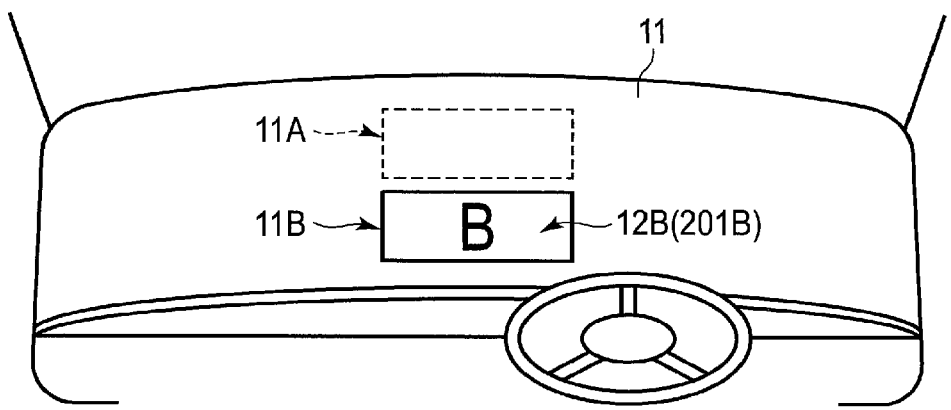
FIG. 3F is an illustration showing the display state of the optical image visually recognized by the display device 10 of the present embodiment.

FIGS. 3A to 3F are illustrations each showing the display state of the optical image visually recognized by the display device 10 of the present embodiment. Note that FIGS. 3A to 3C correspond to examples in which the first projection area 11A and the second projection area 11B of the projection plane 11 are arranged on the right and left (i.e., horizontally) as seen from the user. FIGS. 3D to 3F correspond to examples in which the first projection area 11A and the second projection area 11B are arranged up and down (i.e., vertically) as seen from the user.

The example shown in FIG. 3A illustrates the state in which the first optical image 12A projected onto the first projection area 11A, and the second optical image 12B projected onto the second projection area 11B are arranged on the right and left and displayed. The user can visually recognize virtual images 201A and 201B corresponding to the first optical image 12A and the second optical image 12B, respectively.

The example shown in FIG. 3B illustrates the state in which only the first optical image 12A projected onto the first projection area 11A is displayed. The user can visually recognize only the virtual image 201A corresponding to the first optical image 12A. Note that the second optical image in black display may be projected onto the second projection area 11B, or the light which forms the second optical image (i.e., the second image 305B) may be prevented from reaching the second projection area 11B.

The example shown in FIG. 3C illustrates the state in which only the second optical image 12B projected onto the second projection area 11B is displayed. The user can visually recognize only the virtual image 201B corresponding to the second optical image 12B. Note that the first optical image in black display may be projected onto the first projection area 11A, or the light which forms the first optical image (i.e., the first image 305A) may be prevented from reaching the first projection area 11A.

The example shown in FIG. 3D illustrates the state in which the first optical image 12A projected onto the first projection area 11A, and the second optical image 12B projected onto the second projection area 11B are arranged up and down and displayed. The user can visually recognize virtual images 201A and 201B corresponding to the first optical image 12A and the second optical image 12B, respectively.

The example shown in FIG. 3E illustrates the state in which only the first optical image 12A projected onto the first projection area 11A is displayed. The user can visually recognize only the virtual image 201A corresponding to the first optical image 12A.

The example shown in FIG. 3F illustrates the state in which only the second optical image 12B projected onto the second projection area 11B is displayed. The user can visually recognize only the virtual image 201B corresponding to the second optical image 12B.

In a head-up display, a sign, route guidance, a map, a meter, etc., are displayed as the first optical image 12A and the second optical image 12B.

Figure 4:
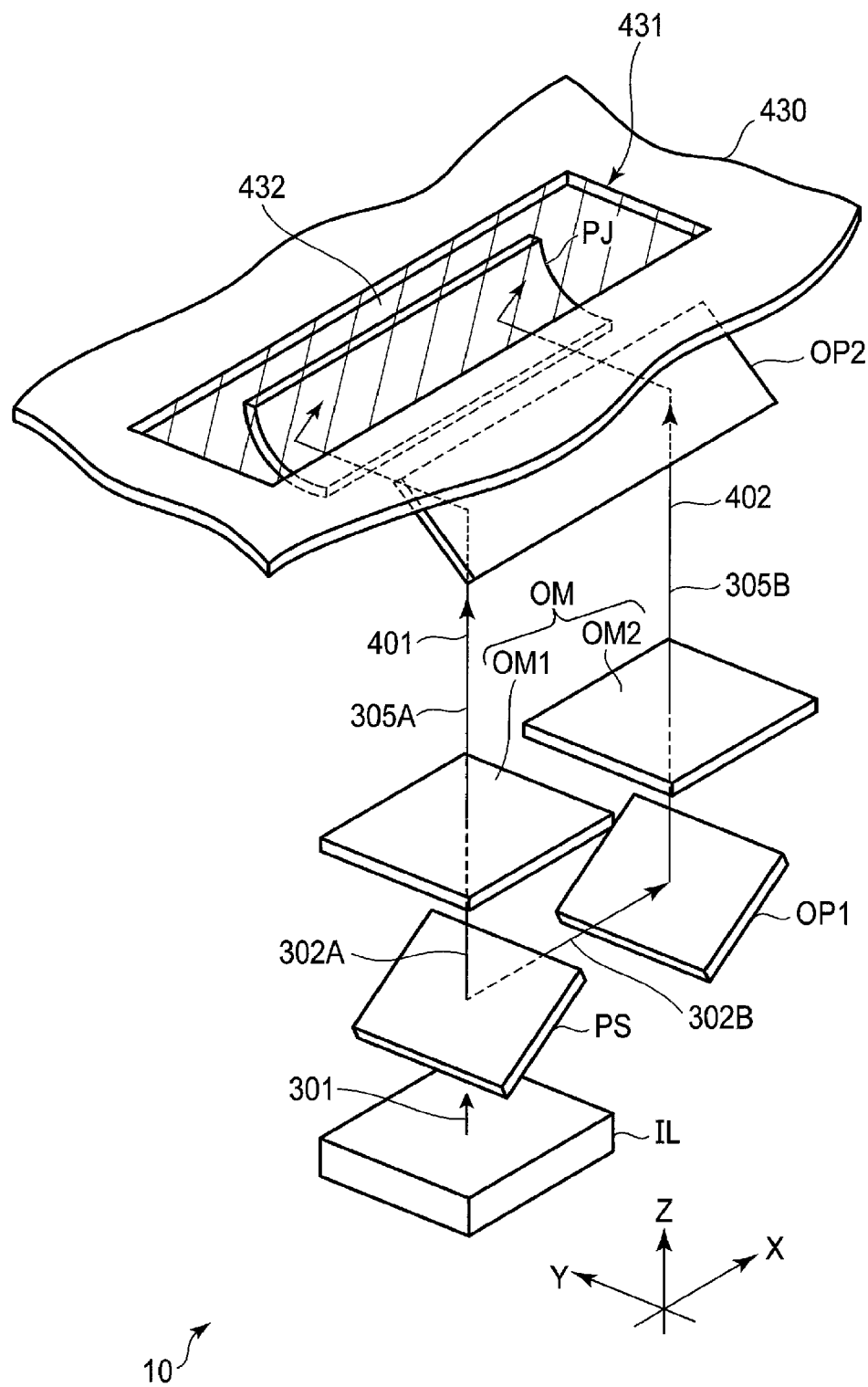
FIG. 4 is a perspective view showing an arrangement example of optical components which constitute the display device 10 according to the present embodiment.

FIG. 4 is a perspective view showing an arrangement example of optical components which constitute the display device 10 according to the present embodiment.

While a first direction X, a second direction Y, and a third direction Z in the figure are orthogonal to each other, they may cross each other at an angle other than 90 degrees. An X-Y plane defined by the first direction X and the second direction Y is parallel to a main surface of the optical component such as the illumination device IL, and the third direction Z corresponds to a direction of travel of the illumination light 301 radiated from the illumination device IL.

The display device 10 is arranged at a space portion ahead of the user. In one example, the display device 10 is arranged within a dashboard 430 located ahead of the user. A top board of the dashboard 430 is provided with an opening 431. At the opening 431, a cover member (a hatched portion in the FIG. 432 which is transparent is arranged. The cover member 432 is a glass plate, a resin plate, or the like.

The illumination device IL, the polarization separation element PS, and the first optical modulation unit OM1 are arranged on the same straight line in this order along the third direction Z. The polarization separation element PS and the mirror OP1 are arranged in the first direction X. The mirror OP1 and the second optical modulation unit OM2 are arranged in the third direction Z. The mirror OP2 is a flat mirror extending in the first direction X, and is arranged in the third direction Z with respect to the first optical modulation unit OM1 and the second optical modulation unit OM2. The projector PJ is arranged in the second direction Y with respect to the mirror OP2. The projector PJ is a concave mirror having a generatrix extending in the first direction X, and a concave curved surface as seen from the mirror OP2. The projector PJ is opposed to the cover member 432.

The first optical path 401 is parallel to the third direction Z between the polarization separation element PS and the mirror OP2, and is parallel to the second direction Y between the mirror OP2 and the projector PJ. The second optical path 402 is parallel to the first direction X between the polarization separation element PS and the mirror OP1, is parallel to the third direction Z between the mirror OP1 and the mirror OP2, and is parallel to the second direction Y between the mirror OP2 and the projector PJ.

The first image 305A of the first optical path 401 and the second image 305B of the second optical path 402 are reflected by the projector PJ. The first image 305A and the second image 305B which are reflected are projected onto the projection plane, not shown, via the cover member 432.

Note that in the arrangement example shown in FIG. 4, the mirror OP2 may be omitted. More specifically, instead of arranging the mirror OP2, each of the constituent elements may be arranged such that light which has passed through the optical modulation element OM directly enters the projector PJ.

Figure 5:
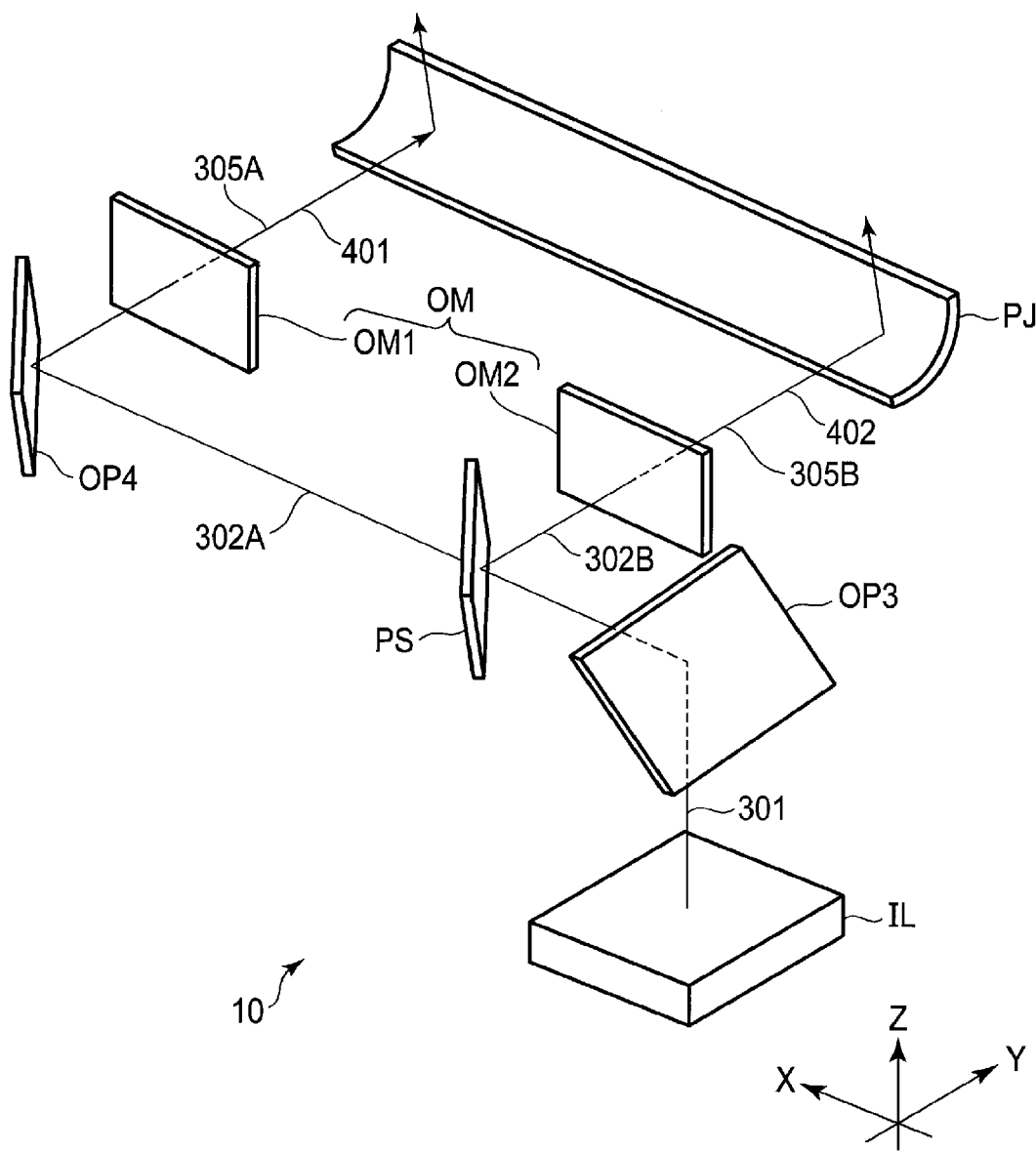
FIG. 5 is a perspective view showing another arrangement example of the optical components which constitute the display device 10 according to the present embodiment.

FIG. 5 is a perspective view showing another arrangement example of the optical components which constitute the display device 10 according to the present embodiment. Note that in the arrangement example illustrated, the same optical components as those of the arrangement example illustrated in FIG. 4 will be designated by the same reference numbers, and explanations of them will be omitted.

The illumination device IL and a mirror OP3 are arranged in the third direction Z. The mirror OP3, the polarization separation element PS, and a mirror OP4 are arranged in this order in the first direction X. The polarization separation element PS and the second optical modulation unit OM2 are arranged in the second direction Y. The mirror OP4 and the first optical modulation unit OM1 are arranged in the second direction Y. The projector PJ is arranged in the second direction with respect to the first optical modulation unit OM1 and the second optical modulation unit OM2. The projector PJ is opposed to a cover member not shown.

The illumination light 301 emitted from the illumination device IL is reflected in the first direction X by the mirror OP3. The transmitted light 302A, which is the light transmitted through the polarization separation element PS, is reflected in the second direction Y by the mirror OP4. The first optical path 401 is parallel to the second direction Y between the mirror OP4 and the projector PJ. The second optical path 402 is parallel to the second direction Y between the polarization separation element PS and the projector PJ.

The first image 305A and the second image 305B are projected onto the projection plane via the cover member not shown.

The arrangement example shown in FIG. 5 enables the cost and size to be reduced as compared to the arrangement example shown in FIG. 4 since a large optical component such as the mirror OP2 is not required.

Note that in the arrangement example shown in FIG. 5, the mirror OP3 may be omitted. More specifically, the illumination device IL may be arranged such that the illumination device IL and the polarization separation element PS are aligned in the first direction X. By doing so, a space along the third direction Z can be reduced, and further reduction in size is enabled.

Note that in the arrangement examples illustrated in FIGS. 4 and 5, the projector PJ is a single concave mirror to which the first image 305A of the first optical path 401 and the second image 305B of the second optical path 402 are both guided. However, the projector PJ is not limited to the example illustrated. Note that the projector PJ may be constituted by two concave mirrors to which a light of the first image 305A of the first optical path 401 and a light of the second image 305B of the second optical path 402 are guided separately, as will be explained by referring to FIG. 6.

Figure 6:
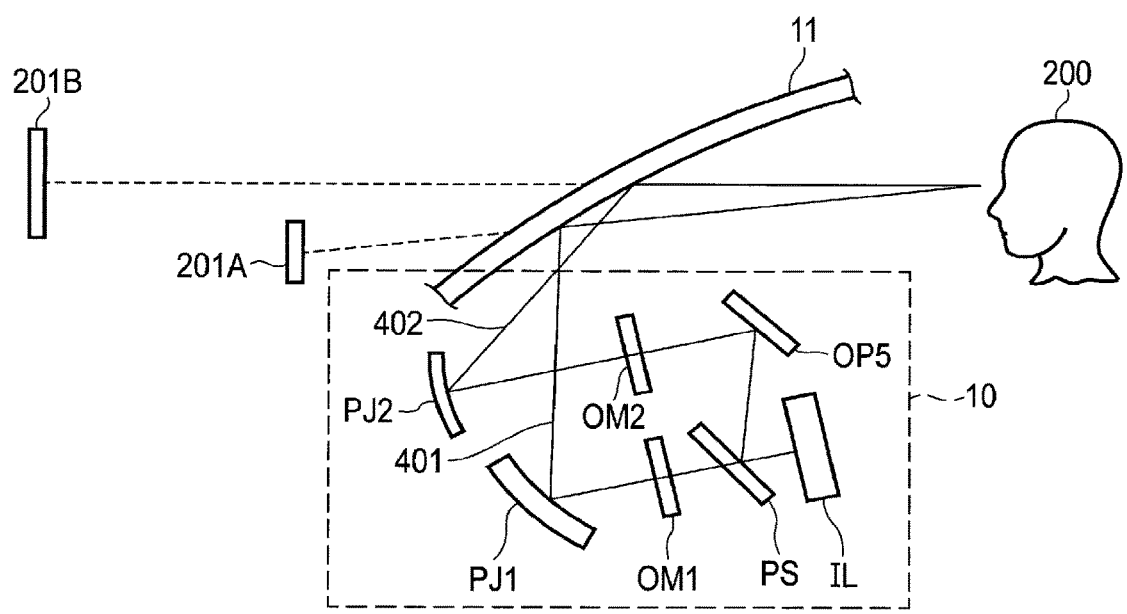
FIG. 6 is an illustration showing yet another arrangement example of the optical components which constitute the display device 10 according to the present embodiment.

FIG. 6 is an illustration showing yet another arrangement example of the optical components which constitute the display device 10 according to the present embodiment.

The arrangement example illustrated is different from the examples illustrated in FIGS. 4 and 5 in that the projector PJ comprises a first concave mirror PJ1 and a second concave mirror PJ2. The first concave mirror PJ1 is located between the first optical modulation unit OM1 and the projection plane 11 in the first optical path 401. The second concave mirror PJ2 is located between the second optical modulation unit OM2 and the projection plane 11 in the second optical path 402.

The transmitted light 302A from the polarization separation element PS travels through the first optical path 401, is modulated into the first image 305A by the first optical modulation unit OM1, is made incident on the first concave mirror PJ1, and is projected onto the projection plane 11. Meanwhile, the reflected light 302B of the polarization separation element PS travels through the second optical path 402, is modulated into the second image 305B by the second optical modulation unit OM2 after being reflected by a mirror OP5, is made incident on the second concave mirror PJ2, and is projected onto the projection plane 11.

According to the arrangement example shown in FIG. 6, by adjusting, for example, an elevation angle of the first concave mirror PJ1 and an elevation angle of the second concave mirror PJ2, projection positions of the first optical image 12A and the second optical image 12B can be adjusted. Also, when an optical path length from the first concave mirror PJ1 to the projection plane 11 is different from an optical path length from the second concave mirror PJ2 to the projection plane 11, image forming positions of the two virtual images 201A and 201B can be made different from each other. In the example illustrated, the virtual image 201B corresponding to the second optical image 12B is visually recognized at a position far from the user 200 than is the virtual image 201A corresponding to the first optical image 12A. If at least one of the first concave mirror PJ1 and the second concave mirror PJ2 is movable, the image forming position of the optical image can be changed according to the user's demand. Also, the image forming position of the optical image can be changed automatically according to the speed of a vehicle in which the present display device 10 is mounted, the use environment, or the like.

According to the present embodiment described above, the display device 10 comprising one illumination device IL can project and display several kinds of different images on different areas of the projection plane 11. Also, the display device 10 can selectively display any one of these different images. Alternatively, the display device 10 can simultaneously display all of these different images. That is, while the display device 10 is small in size, the display device 10 can display an image more extensively as compared to the area of an illumination area of the illumination device IL. Accordingly, a display device 10 capable of displaying various images can be provided.

In addition, the illumination device IL can be downsized to such a scale that a display area of the first optical modulation unit OM1 or the second optical modulation unit OM2 can be illuminated, and the amount of heat generation of the illumination device IL can be reduced.

Next, a configuration example of the illumination device IL, the first optical modulation unit OM1, and the second optical modulation unit OM2 which can be applied to the present embodiment will be described.

Figure 7:
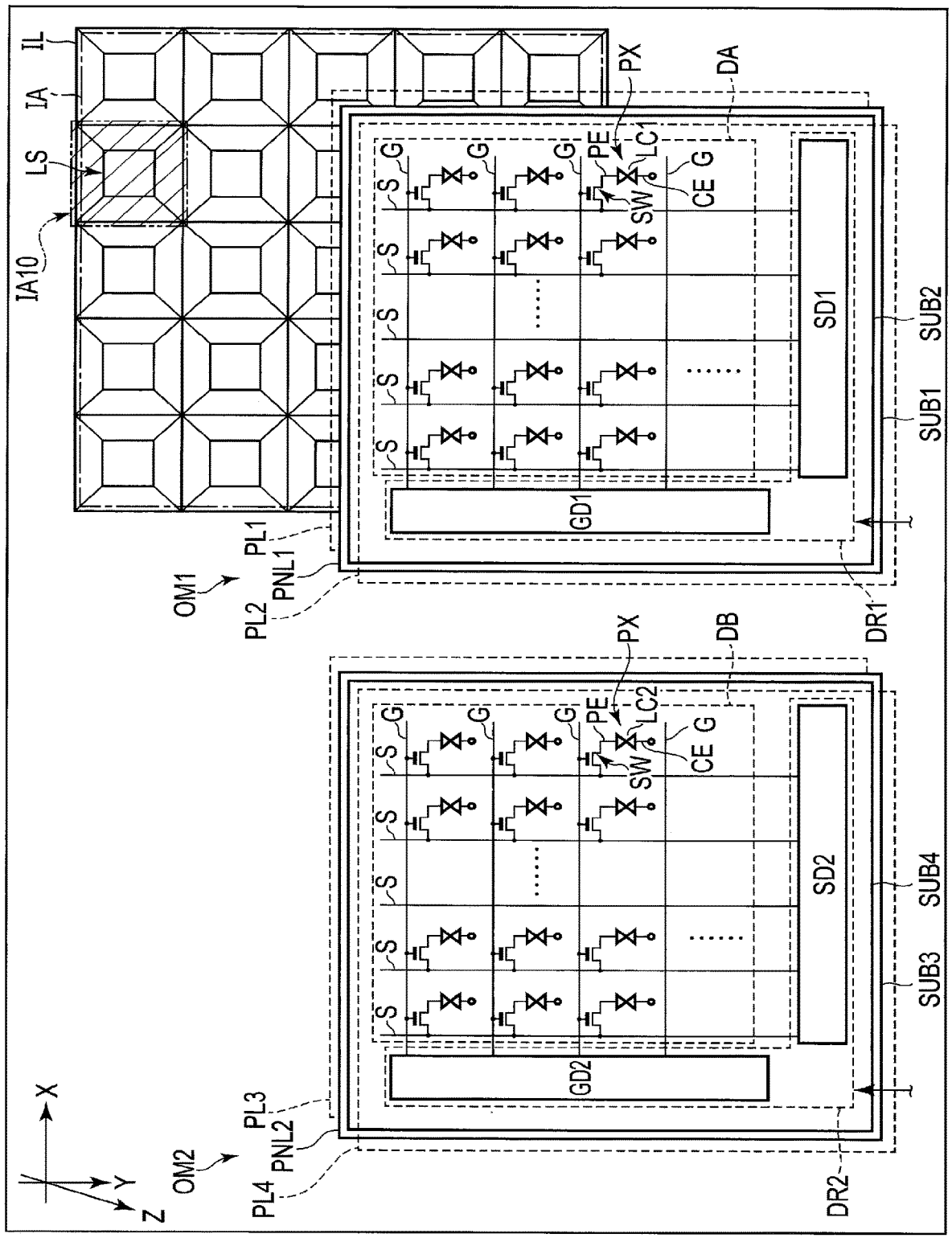
FIG. 7 is an illustration showing a configuration example of an illumination device IL and an optical modulation element OM.

FIG. 7 is an illustration showing a configuration example of the illumination device IL and the optical modulation element OM.

The first optical modulation unit OM1 of the illustrated example corresponds to a transmissive liquid crystal display element. The first optical modulation unit OM1 is constituted of a display panel PNL1, a polarizer PL1, and a polarizer PL2. The first optical modulation unit OM1 may further comprise other structural members. The display panel PNL1 comprises a first substrate SUB1, a second substrate SUB2, and a liquid crystal layer LC1 held between the first substrate SUB1 and the second substrate SUB2. The first substrate SUB1 is arranged on a side close to the illumination device IL of the second substrate SUB2 (i.e., a rear side of the second substrate SUB2). The polarizer PL1 is located on a rear side of the first substrate SUB1. The polarizer PL2 is located on a front side of the second substrate SUB2. A transmission axis of the polarizer PL1 is parallel to the oscillation plane of the transmitted light 302A, and the polarizer PL1 transmits, for example, the first polarized light. For example, a transmission axis of the polarizer PL2 is intersecting the transmission axis of the polarizer PL1 in the X-Y plane, and the polarizer PL2 transmits the second polarized light. More specifically, the transmission axis of the polarizer PL2 is orthogonal to the transmission axis of the polarizer PL1.

The first optical modulation unit OM1 includes a display area DA in which an image is displayed. The first optical modulation unit OM1 comprises a plurality of pixels PX arrayed in a matrix in the first direction X and the second direction Y within the display area DA. The first substrate SUB1 comprises scanning lines G (also referred to as gate lines) and signal lines S (also referred to as data lines or source lines) intersecting the scanning lines G. A first driver DR1 which drives the pixels PX includes a scanning line driver GD1 and a signal line driver SD1. Each of the scanning lines G is drawn outside the display area DA, and is connected to the scanning line driver GD1. Each of the signal lines S is drawn outside the display area DA, and is connected to the signal line driver SD1. The scanning line driver GD1 and the signal line driver SD1 are controlled based on image data for displaying an image in the display area DA.

Each of the pixels PX comprises a switching element SW (for example, a thin-film transistor), a pixel electrode PE, a common electrode CE, and the like. The switching element SW is electrically connected to the scanning line G and the signal line S. The pixel electrode PE is electrically connected to the switching element SW. The common electrode CE is opposed to a plurality of pixel electrodes PE. The pixel electrode PE and the common electrode CE function as drive electrodes which drive the liquid crystal layer LC1. The pixel electrode PE and the common electrode CE are formed of, for example, a transparent conductive material such as indium tin oxide (ITO) or indium zinc oxide (IZO).

The second optical modulation unit OM2 corresponds to a transmissive liquid crystal display element. The second optical modulation unit OM2 is constituted of a display panel PNL2, a polarizer PL3, and a polarizer PL4. The second optical modulation unit OM2 may further comprise other structural members. The display panel PNL2 comprises a third substrate SUB3, a fourth substrate SUB4, and a liquid crystal layer LC2 held between the third substrate SUB3 and the fourth substrate SUB4. The third substrate SUB3 is disposed on a rear side of the fourth substrate SUB4. The polarizer PL3 is located on a rear side of the third substrate SUB3. The polarizer PL4 is located on a front side of the fourth substrate SUB4. A transmission axis of the polarizer PL3 is parallel to the oscillation plane of the reflected light 302B, and the polarizer PL3 transmits, for example, the second polarized light. For example, a transmission axis of the polarizer PL4 is intersecting the transmission axis of the polarizer PL3 in the X-Y plane, and the polarizer PL4 transmits the first polarized light. More specifically, the transmission axis of the polarizer PL4 is orthogonal to the transmission axis of the polarizer PL3.

The second optical modulation unit OM2 includes a display area DB in which an image is displayed, and a second driver DR2 which drives the pixels PX. The second driver DR2 includes a scanning line driver GD2 and a signal line driver SD2. Since the structure of the second optical modulation unit OM2 is similar to that of the first optical modulation unit OM1, detailed explanation of the structure of the second optical modulation unit OM2 is omitted.

The illumination device IL includes an illumination area IA corresponding to the display areas DA and DB. In one example, the illumination area IA is opposed to the display area DA. In the example illustrated, the illumination device IL comprises light sources LS arrayed in a matrix in the first direction X and the second direction Y in the illumination area IA. Although the light source LS is a light-emitting diode which emits white light, for example, the light source LS is not limited to this. As the light source LS which emits white light, a light source constituted of light-emitting diodes which emit red, green, and blue light integrated into one chip, or a light source structured by combining a light-emitting diode which emits blue or near-ultraviolet light and a phosphor, for example, can be applied. The brightness of the light source LS as described above can be controlled in accordance with the magnitude of a current to be supplied.

In one example, a single light source LS is arranged to be opposed to a sub-display area of the display area DA constituted of m×n pixels PX, and light guided from the same light source LS illuminates the sub-display area of the display area DB constituted of o×p pixels PX. In the above, m to p are positive integers, m and o each corresponds to the number of pixels PX arranged in the first direction X, and n and p each corresponds to the number of pixels PX arranged in the second direction Y. The numbers of o and p are equal to the numbers of m and n, respectively, for example. Turning on and off of the light sources LS can be controlled individually. Accordingly, in the illumination area IA, the illumination device IL can include sub-illumination areas IA10 where turning on and off of the light can be controlled individually. The sub-illumination area IA10 comprises at least one light source LS. The sub-illumination areas IA10 can be formed variously, such as in a strip shape extending in the first direction X, a strip shape extending in the second direction Y, or in a matrix arranged in the first direction X and the second direction Y, in the X-Y plane. In one example, when the sub-illumination area IA10 comprises one light source LS, the sub-illumination area IA10 corresponds to a hatched area in the drawing which is opposed to the light source LS and reflection surfaces surrounding the light source LS.

Figure 8:
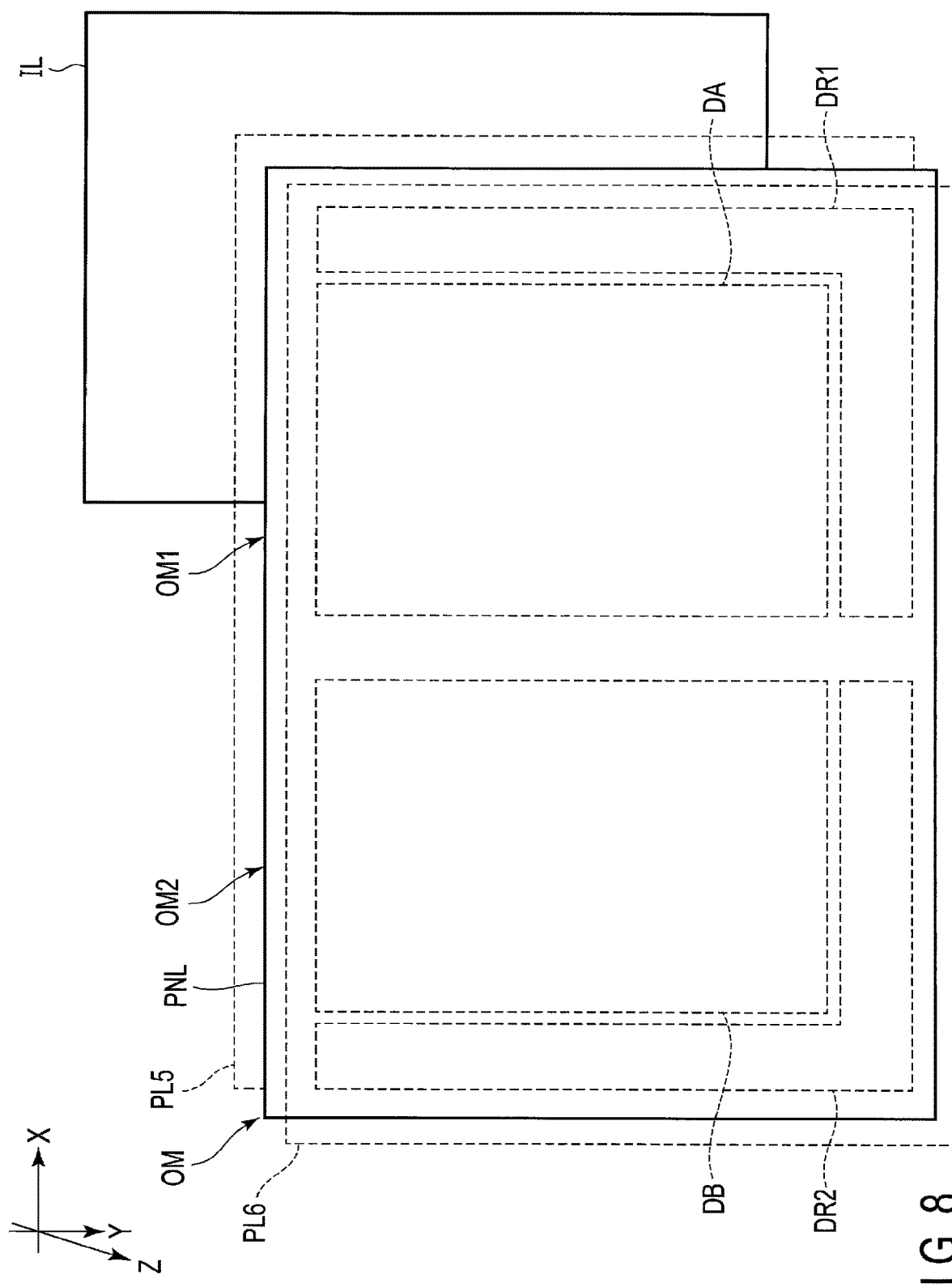
FIG. 8 is an illustration showing another configuration example of the illumination device IL and the optical modulation element OM.

FIG. 8 is an illustration showing another configuration example of the illumination device IL and the optical modulation element OM.

In the present configuration example, each of the first optical modulation unit OM1 and the second optical modulation unit OM2 corresponds to a part of a single liquid crystal display element, and is constituted of a single display panel PNL, a polarizer PL5, and a polarizer PL6. The first optical modulation unit OM1 and the second optical modulation unit OM2 may further comprise other structural members. The polarizer PL5 is disposed on a rear side of the display panel PNL, and the polarizer PL6 is disposed on a front side of the display panel PNL.

The display panel PNL includes the display areas DA and DB adjacent to each other. Each of the polarizer PL5 and the polarizer PL6 is disposed over the entire surfaces of the display areas DA and DB. Also, the display panel PNL comprises the first driver DR1 which is located on a side opposite to a side where the display area DA is adjacent to the display area DB, and the second driver DR2 which is located on a side opposite to a side where the display area DB is adjacent to the display area DA.

The first optical modulation unit OM1 corresponds to the display area DA. The second optical modulation unit OM2 corresponds to the display area DB. In such a structure, a polarization direction of the transmitted light 302A when it enters the display area DA must be parallel to a polarization direction of the reflected light 302B when it enters the display area DB. Accordingly, at least one retardation plate is arranged in the first optical path 401 or the second optical path 402 between the illumination device IL and the optical modulation element OM. For example, when the polarizer PL5 has a transmission axis which transmits the first polarized light, a retardation plate corresponding to a half-wave plate ($\lambda/2$ plate) is arranged in either the second position 122 or the third position 123 shown in FIG. 2. In addition, a transmission axis of the polarizer PL6 is intersecting the transmission axis of the polarizer PL5, for example. More specifically, the transmission axis of the polarizer PL6 is orthogonal to the transmission axis of the polarizer PL5.

According to the configuration example shown in FIG. 8, since the number of optical members which constitute the optical modulation element OM can be reduced, the display device 10 can be made small.

Note that the present embodiment is not limited to the case of performing control with two drivers, which are the first driver DR1 and the second driver DR2, as in the arrangement example illustrated in FIG. 8, but the driver for controlling the display panel PNL may be one. That is, the two display areas, i.e., the display area DA and the display area DB, may be controlled with a single driver.

<Local Dimming Control>

Next, local dimming control will be described.

Figure 9:
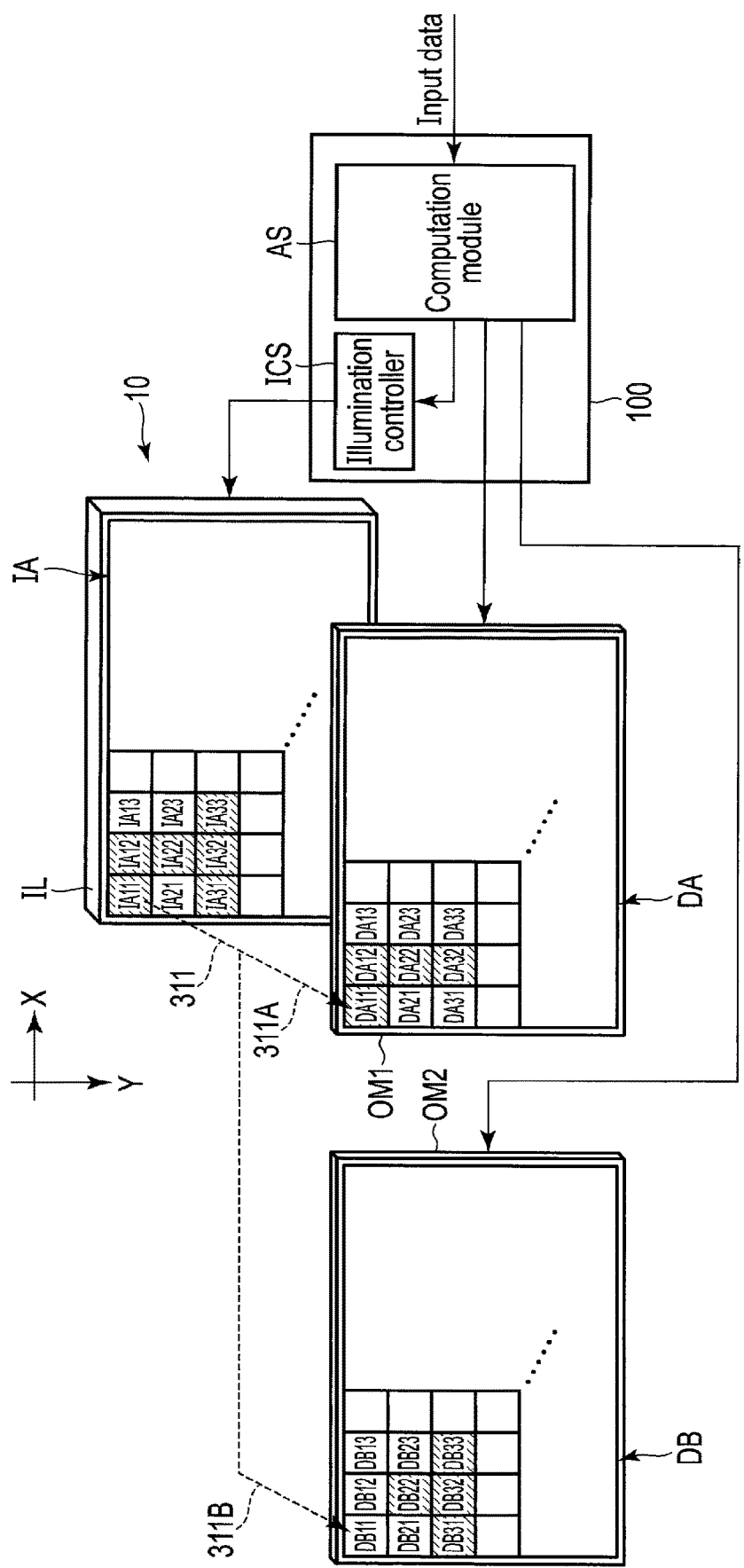
FIG. 9 is an illustration showing a configuration example of the display device 10 to which local dimming control is applied.

FIG. 9 is an illustration showing a configuration example of the display device 10 to which the local dimming control is applied.

The illumination device IL includes sub-illumination areas IA11, IA12, . . . , arranged in a matrix in the illumination area IA. The first optical modulation unit OM1 includes sub-display areas DA11, DA12, . . . , arranged in a matrix in the display area DA. The second optical modulation unit OM2 includes sub-display areas DB11, DB12, . . . , arranged in a matrix in the display area DB. The sub-illumination area corresponds to the sub-display area of the display area DA and to the sub-display area of the display area DB, respectively. In other words, one sub-illumination area illuminates one of the sub-display areas of the display area DA and one of the sub-display areas of the display area DB. As the specific example illustrated, sub-illumination light 311 emitted from the sub-illumination area IA11 is separated into sub-transmitted light 311A and sub-reflected light 311B. The sub-transmitted light 311A enters the sub-display area DA11 of the first optical modulation unit OM1, is modulated, and is displayed as a first sub-image. The sub-reflected light 311B enters the sub-display area DB11 of the second optical modulation unit OM2, is modulated, and is displayed as a second sub-image.

As has been explained with reference to FIG. 7, each of the sub-illumination areas includes at least one light source. Each of the sub-display areas of the display area DA comprises m×n pixels PX. Each of the sub-display areas of the display area DB comprises o×p pixels PX. The brightness of the sub-illumination area can be controlled in accordance with a value of a current supplied to the light source. Accordingly, by changing the current values of the respective light sources of the sub-illumination areas, the brightness can be changed for each of the sub-illumination areas.

The sub-illumination area IA11 illuminates the sub-display area DA11 and the sub-display area DB11 at a brightness level according to image data for driving each of the sub-display areas DA11 and DB11 in synchronization with display of the images in the sub-display area DA11 and the sub-display area DB11. Accordingly, in the display areas DA and DB, by setting the brightness of a sub-illumination area, which illuminates the sub-display area including many pixels whose gradation values are low, at a low level, and setting the brightness of a sub-illumination area, which illuminates the sub-display area including many pixels whose gradation values are high, at a high level, the contrast ratio of an image to be displayed in the display areas DA and DB can be improved.

An example of control will be briefly described below.

A main controller 100 comprises a computation module AS, an illumination controller ICS, etc. The computation module AS performs necessary processing for items of input data for displaying images on the first optical modulation unit OM1 and the second optical modulation unit OM2, and generates items of image data. Further, the computation module AS inputs the items of image data which have been generated to the first optical modulation unit OM1 and the second optical modulation unit OM2, respectively. In this way, the first optical modulation unit OM1 and the second optical modulation unit OM2 can display images in the display areas DA and DB, respectively.

Meanwhile, the computation module AS calculates, for each of the two sub-display areas (i.e., the sub-display area of the display area DA and the sub-display area of the display area DB) corresponding to each sub-illumination area, the average gradation value of pixels of the sub-display area from the gradation values of the image data covering the entire pixels of the display areas DA and DB. The illumination controller ICS calculates a current value to be supplied to the light source of the sub-illumination area, on the basis of the higher average gradation value of the two average gradation values calculated by the computation module AS. Then, the illumination controller ICS supplies the current of the calculated value to the light source.

The computation module AS and the illumination controller ICS are controlled based on a synchronization signal. The light source provided in the sub-illumination area is thereby lit at a brightness level according to the higher average gradation value in synchronization with displaying of the images in the corresponding two sub-display areas. Note that if the average gradation values of the two sub-display areas are both extremely low, the light source may be turned off. Also, while the current value of the light source has been determined based on the average gradation value of the sub-display area in the above, other methods, such as determining the current value of the light source based on the maximum gradation value of the pixels included in the sub-display area, may be applied. In either case, the current value of the light source is determined based on a gradation value obtained by a predetermined algorithm from the pixel data.

By such local dimming control, the contrast ratio of the optical image projected onto the projection plane 11 can be improved. In addition, power consumption of the illumination device IL can be reduced, and the amount of heat generation of the illumination device IL can be reduced.

<Brightness Control of Illumination Device>

Figure 10:
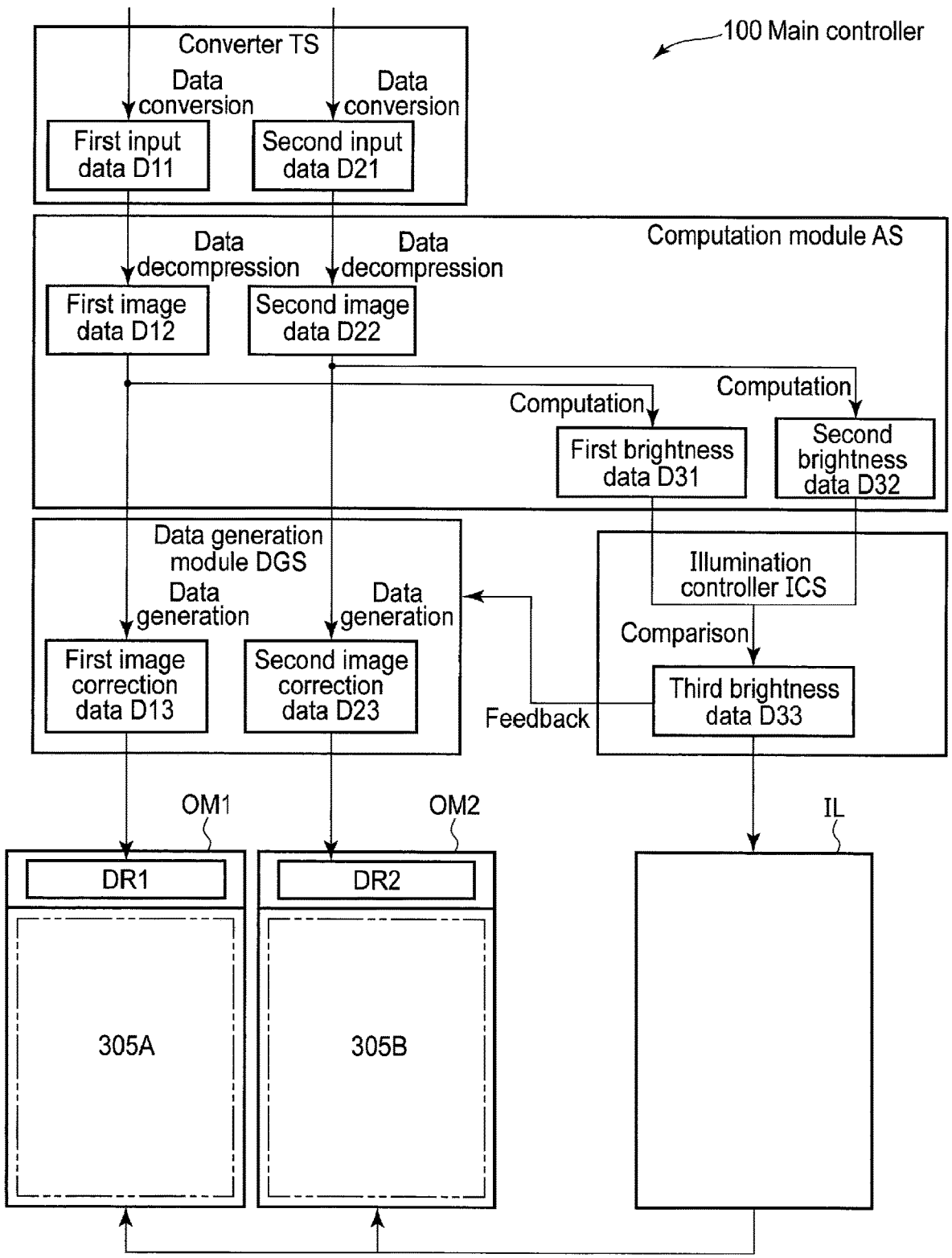
FIG. 10 is a block diagram showing a flow of data when luminance of a pixel PX is controlled.

FIG. 10 is a block diagram showing a flow of data when luminance of the pixel PX is controlled.

The main controller 100 includes a converter TS, the computation module AS, a data generator DGS, the illumination controller ICS, etc. Explanation will be given assuming that the first optical modulation unit OM1 and the second optical modulation unit OM2 are transmissive display panels. Note that when the first optical modulation unit OM1 and the second optical modulation unit OM2 are reflective display panels, the term "transmittance" in the following explanation is replaced with "reflectance". Further, in the explanation of the present configuration example, RGB data may be referred to as (R, G, B), and RGBW data may be referred to as (R, G, B, W).

The converter TS includes a linear conversion circuit, and converts data on the first image 305A represented by RGB data in 8 bits (0 to 255) for each of R, G, and B, for example, into first input data D11 represented by linear RGB data. The converter TS similarly converts data on the second image 305B into second input data D21. Further, the converter TS normalizes the first input data D11 and the second input data D21 to values greater than or equal to 0 and less than or equal to 1. The first input data D11 and the second input data D21 correspond to, for example, the luminance of RGB pixels, and when the value is 0, the pixel is displayed black, and when the value is 1, the pixel is displayed white. Note that the normalization process of the first input data D11 and the second input data D21 is not necessarily required. When each of the first optical modulation unit OM1 and the second optical modulation unit OM2 includes a W pixel, in addition to the RGB pixels, after converting, for example, the 8-bit RGB data into linear RGB data by the converter TS, the converter TS allocates a common part of the RGB data to the W data, and generates RGBW data.

The computation module AS performs data decompression while maintaining the ratio between signal values (RGB data) of the red pixel, green pixel and blue pixel included in the first input data D11 for the first image, and converts first input data D11 into first image data D12. At this time, a decompression rate of each item of data is a reciprocal of the maximum value of the RGB data, for example. That is, when the magnitude relation of the first input data D11 (R11, G11, B11) is R11>G11≥B11, the decompression rate is represented as (1/R11). Each item of the first image data D12 (R12, G12, B12) is calculated as follows: R12=(1/R11)× R11=1, G12=(1/R11)×G11=G11/R11, B12=(1/R11)× B11=B11/R11. The computation module AS similarly calculates second image data D22 from the second input data D21 for the second image.

Next, the computation module AS computes, on the basis of the first image data D12, first brightness data D31 representing the brightness of the illumination device IL necessary for realizing desired pixel luminance in an area driven with the first image data D12. The first brightness data D31 is normalized to a value which is greater than or equal to 0 and less than or equal to 1, for example. The illumination device IL is turned off when the value is 0, and turned on at the maximum brightness when the value is 1. When it is assumed that the first image data D12 corresponds to the transmittances of the RGB pixels, the pixel luminance can be represented as the product of the transmittance of the pixel and the brightness of the illumination device. The computation module AS calculates the first brightness data D31 from a reciprocal of the rate of decompression from the first input data D11 to the first image data D12. More specifically, when the decompression rate is 1/R11, the first brightness data D31 is calculated as R11 by the computation module AS. The computation module AS similarly calculates second brightness data D32 from the second image data D22.

The illumination controller ICS compares the first brightness data D31 and the second brightness data D32, and generates third brightness data D33. Either the first brightness data D31 or the second brightness data D32, for example, is selected as the third brightness data D33. The brightness data to be selected is one having a greater value of the first brightness data D31 and the second brightness data D32, for example, more specifically, brightness data for driving the illumination device IL at a high brightness level. The illumination controller ICS controls the brightness of the illumination device IL based on the third brightness data D33. The third brightness data D33 is data for determining a current value for the light source arranged in the area of the illumination device IL corresponding to the first image data D12 and the second image data D22. In addition, the illumination controller ICS feeds back the third brightness data D33 to the data generator DGS.

The data generator DGS recomputes the first image data D12 based on the third brightness data D33 that has been fed back, and generates first image correction data D13 corresponding to the first image data D12. The first image correction data D13 is calculated by multiplying the first image data D12 by a correction coefficient, which is a value obtained by dividing the first brightness data D31 by the third brightness data D33 (D31/D33). More specifically, each item of RGB data of the first image correction data D13, i.e., (R13, G13, B13), is calculated as follows: R13= (D31/D33)×R12, G13=(D31/D33)×G12, B13=(D31/D33)× B12. When the first brightness data D31 is selected as the third brightness data D33, the first image correction data D13 is equal to the first image data D12. In addition, the data generator DGS recomputes the second image data D22 based on the third brightness data D33, and generates second image correction data D23 corresponding to the second image data D22. Note that the correction coefficient for this process is represented as a value obtained by dividing the second brightness data D32 by the third brightness data D33 (D32/D33).

Items of the first image correction data D13 and the second image correction data D23 generated in this way are input to the first driver DR1 and the second driver DR2, respectively. The first driver DR1 drives the first optical modulation unit OM1 based on the first image correction data D13, and the first image 305A is displayed. The second driver DR2 drives the second optical modulation unit OM2 based on the second image correction data D23, and the second image 305B is displayed. At this time, when each of the first optical modulation unit OM1 and the second optical modulation unit OM2 is a liquid crystal display panel whose modulation (transmittance or reflectance) is controlled by the applied voltage, the first driver DR1 and the second driver DR2 control the voltages applied to the first optical modulation unit OM1 and the second optical modulation unit OM2 based on the first image correction data D13 and the second image correction data D23, respectively. More specifically, the voltages applied to the first optical modulation unit OM1 and the second optical modulation unit OM2 are changed in proportion to the correction coefficients of the first image correction data D13 and the second image correction data D23.

It suffices that either hardware or software realizes the function of the data processing of the main controller 100, and the data processing is not particularly limited. Also, if each of the converter TS, the computation module AS, the illumination controller ICS, and the data generator DGS is constituted of hardware, each element does not need to be distinguished from each other physically. That is, multiple functions may be realized by a physically single circuit.

Next, referring to FIGS. 11 and 12, data processing to be carried out when the first and second images are expressed by RGB pixels will be described based on an example of numerical values. Here, it is assumed that the first input data D11 (R11, G11, B11) is (0.20, 0.80, 0.80), and the second input data D21 (R21, G21, B21) is (0.60, 0.60, 0.60).

FIG. 11 is an illustration showing one example of data processing in the computation module AS.

Since the maximum value of the first input data D11 is G11=B11=0.80, the computation module AS performs data decompression assuming that the decompression rate of the first input data D11 is 1/0.80. The first image data D12 (R12, G12, B12) is calculated as (0.25, 1.00, 1.00) by multiplying the first input data D11 by the decompression rate. Since the first brightness data D31 is a reciprocal of the decompression rate (1/0.80), the first brightness data D31 is computed as D31=0.80 by the computation module AS.

Since the maximum value of the second input data D21 is R21=G21=B21=0.60, the computation module AS performs data decompression assuming that the decompression rate of the second input data D21 is 1/0.60. The second image data D22 (R22, G22, B22) is calculated as (1.00, 1.00, 1.00) by multiplying the second input data D21 by the decompression rate. Since the second brightness data D32 is a reciprocal of the decompression rate (1/0.60), the second brightness data D32 is computed as D32=0.60 by the computation module AS.

FIG. 12 is an illustration showing one example of data processing in the illumination controller ICS and the data generator DGS.

The illumination controller ICS compares the first brightness data D31, i.e., 0.80, with the second brightness data D32, i.e., 0.60, and selects the first brightness data D31 as the third brightness data D33. The data generator DGS performs recomputation based on the fed back third brightness data D33, i.e., 0.80, and generates the second image correction data D23 (R23, G23, B23), which is (0.75, 0.75, 0.75), from the second image data D22 (1.00, 1.00, 1.00). Note that the third brightness data D33 is equal to the first brightness data D31. Therefore, the data generator DGS does not perform recomputation to obtain the first image correction data D13, and generates the first image correction data D13 (R13, G13, B13), which is equal to the first image data D12 (R12, G12, B12), more specifically, (0.25, 1.00, 1.00).

Next, referring to FIGS. 13 and 14, data processing to be carried out when the first and second images are expressed by RGBW pixels will be described based on an example of numerical values. Here, it is assumed that first RGB data D10 (R10, G10, B10) converted by the converter TS is (0.30, 0.90, 0.90), and second RGB data D20 (R20, G20, B20) is (0.15, 0.90, 0.15).

Figure 13:
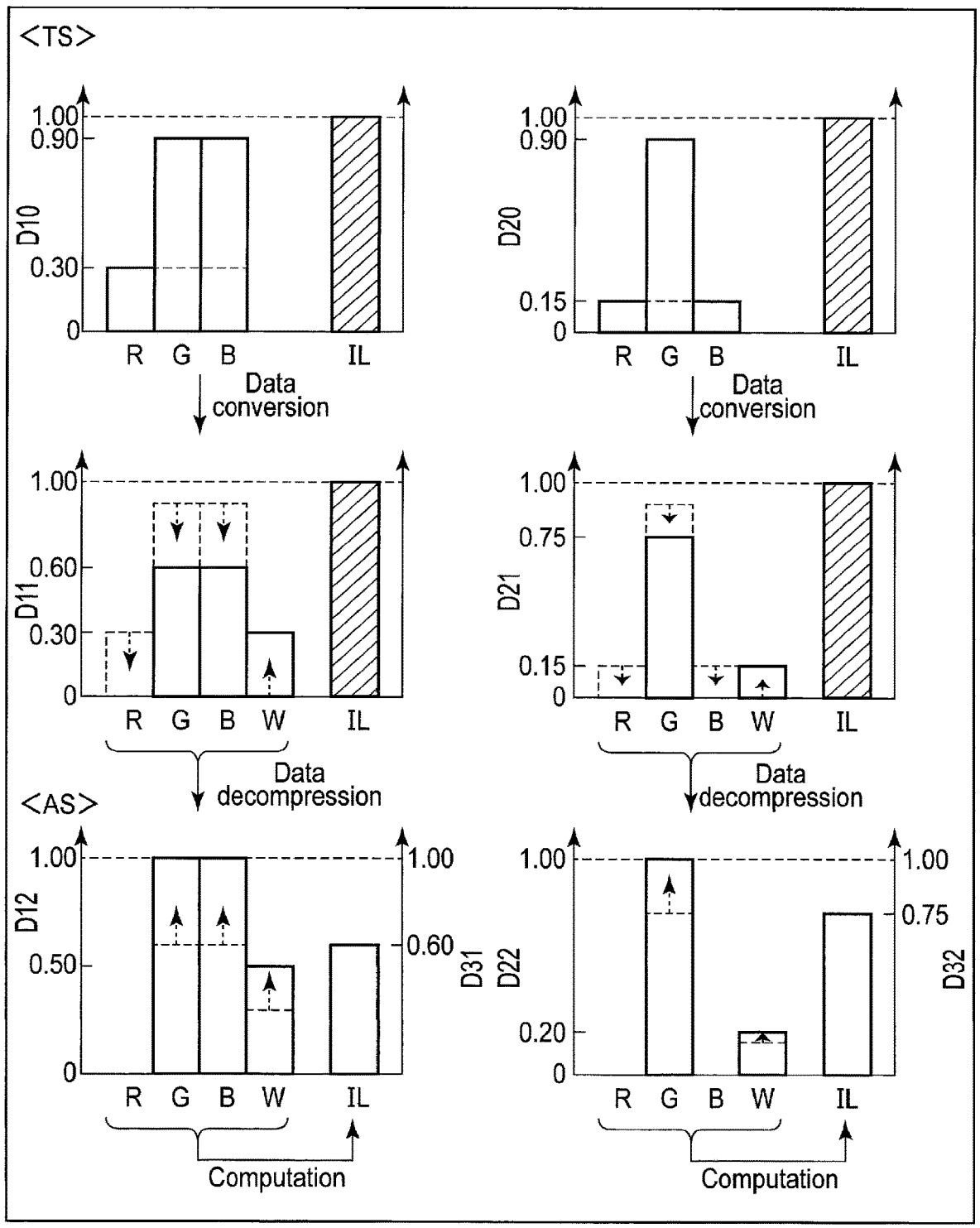

FIG. 13 is an illustration showing one example of data processing in the converter TS and the computation module AS.

The converter TS allocates data common to the R data, G data, and B data of the first RGB data D10, i.e., 0.30, to W data, thereby converting the RGB data into RGBW data, and calculates the first input data D11 (R11, G11, B11, W11) as (0.00, 0.60, 0.60, 0.30). Also, the converter TS allocates data common to the R data, G data, and B data of the second RGB data D20, i.e., 0.15, to W data, thereby converting the RGB data into RGBW data, and calculates the second input data D21 (R21, G21, B21, W21) as (0.00, 0.75, 0.00, 0.15).

Since the maximum value of the first input data D11 is G11=B11=0.60, the computation module AS performs data decompression assuming that the decompression rate of the first input data D11 is 1/0.60. The first image data D12 (R12, G12, B12, W12) is calculated as (0.00, 1.00, 1.00, 0.50) by multiplying the first input data D11 by the decompression rate. Since the first brightness data D31 is a reciprocal of the decompression rate (1/0.60), the first brightness data D31 is computed as D31=0.60 by the computation module AS.

Since the maximum value of the second input data D21 is G21=0.75, the computation module AS performs data decompression assuming that the decompression rate of the second input data D21 is 1/0.75. The second image data D22 (R22, G22, B22, W22) is calculated as (0.00, 1.00, 0.00, 0.20) by multiplying the second input data D21 by the decompression rate. Since the second brightness data D32 is a reciprocal of the decompression rate (1/0.75), the second brightness data D32 is computed as D32=0.75 by the computation module AS.

Figure 14:
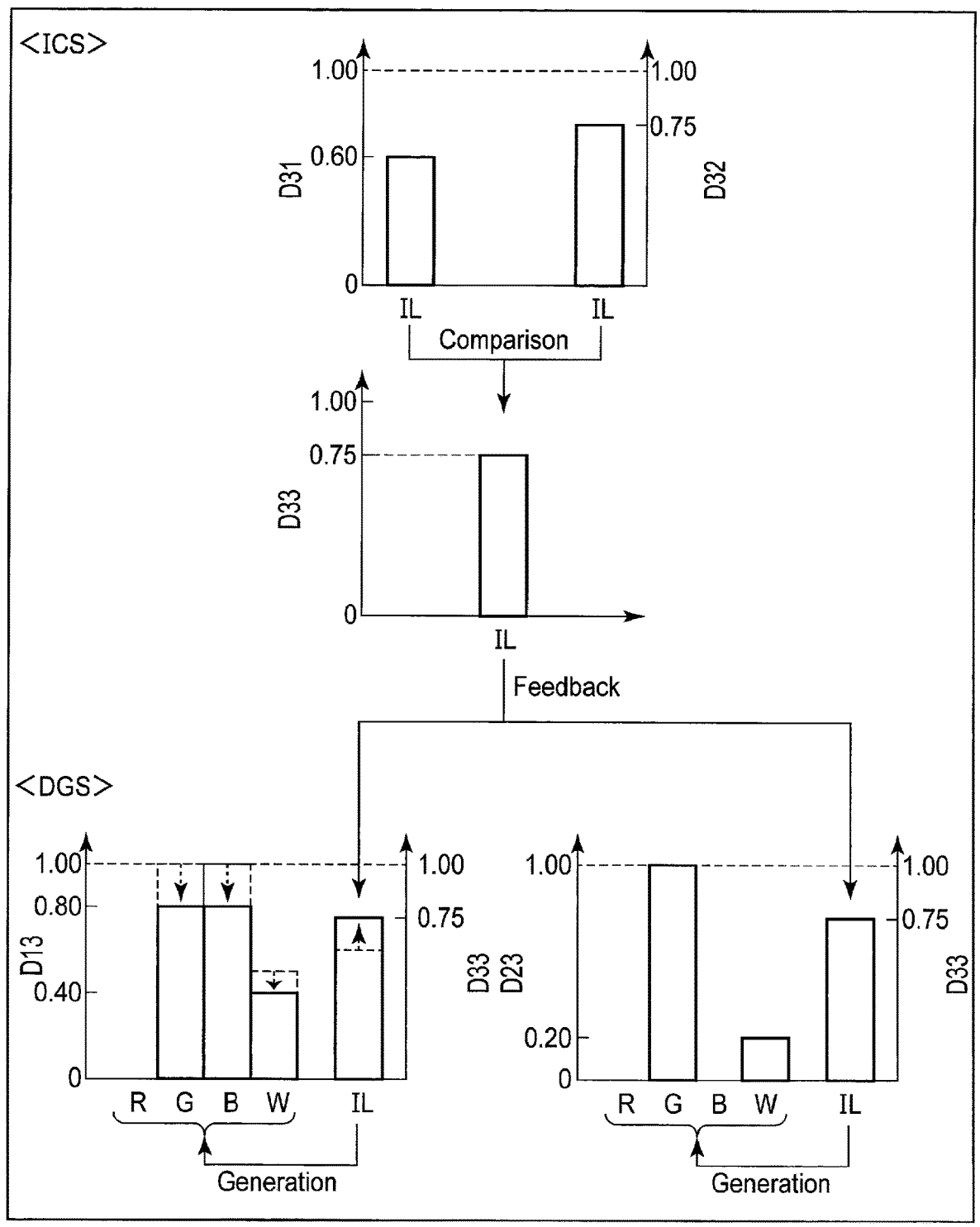
FIG. 14 is an illustration showing one example of data processing in the illumination controller ICS and the data generator DGS.

FIG. 14 is an illustration showing one example of data processing in the illumination controller ICS and the data generator DGS.

The illumination controller ICS compares the first brightness data D31, i.e., 0.60, with the second brightness data D32, i.e., 0.75, and selects the second brightness data D32 as the third brightness data D33. The data generator DGS performs recomputation based on the fed back third brightness data D33, i.e., 0.75, and generates the first image correction data D13 (R13, G13, B13, W13), which is (0.00, 0.80, 0.80, 0.40), from the first image data D12 (0.00, 1.00, 1.00, 0.50). Note that the third brightness data D33 is equal to the second brightness data D32. Therefore, the data generator DGS does not perform recomputation to obtain the second image correction data D23, and generates the second image correction data D23 (R23, G23, B23, W23), which is equal to the second image data D22 (R22, G22, B22, W22), more specifically, (0.00, 1.00, 0.00, 0.20).

The brightness of the illumination device IL is controlled based on the third brightness data D33. Accordingly, as compared to a case where the brightness of the illumination device IL is controlled based on the first input data D11 and the second input data D21, it is possible to suppress the brightness of the illumination device IL, reduce power consumption of the illumination device IL, and reduce the amount of heat generation of the illumination device IL.

As described above, according to the present embodiment, a display device capable of displaying various images while reducing the amount of heat generation can be provided.

Modification

FIG. 15A is an illustration showing a modification of the display device 10 comprising a first polarization controller PC1 and a second polarization controller PC2.

In the present modification, the display device 10 of the arrangement example shown in FIG. 2 further comprises the first polarization controller PC1, the second polarization controller PC2, a polarizer PL7, and a polarizer PL8. The structure illustrated in FIG. 7 is applicable to the optical modulation element OM, and in the illustrated example, the first optical modulation unit OM1 is constituted of the display panel PNL1, the polarizer PL1, and the polarizer PL2, and the second optical modulation unit OM2 is constituted of the display panel PNL2, the polarizer PL3, and the polarizer PL4.

The first polarization controller PC1 is located in the first optical path 401 between the polarization separation element PS and the display panel PNL1. The first polarization controller PC1 is configured to control the polarization direction of the transmitted light 302A, and emits the entered transmitted light 302A as emission light 303A. The first polarization controller PC1 is, for example, a liquid crystal element comprising a liquid crystal layer between a pair of electrode substrates, and controls retardation of the liquid crystal layer between an off-state in which a voltage is not applied to the liquid crystal layer and an on-state in which a voltage is applied to the liquid crystal layer. In the liquid crystal layer, a retardation Δn·d imparted to light which is transmitted through the liquid crystal layer is, for example, zero in the off-state and λ/2 in the on-state. Note that Δn is the refractive anisotropy of the liquid crystal layer, d is the substantial thickness of the liquid crystal layer, and λ is the wavelength of light incident on the liquid crystal layer.

The polarizer PL7 is located in the first optical path 401 between the first polarization controller PC1 and the display panel PNL1. The polarizer PL7 includes a transmission axis which transmits third polarized light. In other words, the emission light 303A from the polarizer PL7 is linearly polarized light having a predetermined oscillation plane. In one example, the transmission axis of the polarizer PL7 intersects the polarization direction of the transmitted light 302A when the transmitted light 302A enters the first polarization controller PC1. At this time, when the first polarized light enters the first polarization controller PC1, the third polarized light has an oscillation plane intersecting that of the first polarized light. Alternatively, the transmission axis of the polarizer PL7 may be parallel to the polarization direction of the transmitted light 302A when the transmitted light 302A enters the first polarization controller PC1.

The second polarization controller PC2 is located in the second optical path 402 between the polarization separation element PS and the display panel PNL2. The second polarization controller PC2 is configured to control the polarization direction of the transmitted light 302B, and emits the entered transmitted light 302B as emission light 303B. The second polarization controller PC2 can be structured by a liquid crystal element similar to that of the first polarization controller PC1. The first polarization controller PC1 and the second polarization controller PC2 are arranged separately in the example illustrated. However, the first polarization controller PC1 and the second polarization controller PC2 may be constituted by separate liquid crystal elements, respectively, or the first polarization controller PC1 and the second polarization controller PC2 may be constituted by a single liquid crystal element.

The polarizer PL8 is located in the second optical path 402 between the second polarization controller PC2 and the display panel PNL2. The polarizer PL8 includes a transmission axis which transmits fourth polarized light. In one example, the transmission axis of the polarizer PL8 intersects the polarization direction of the transmitted light 302B when the transmitted light 302B enters the second polarization controller PC2, the second polarized light enters the second polarization controller PC2, and the fourth polarized light having an oscillation plane intersecting that of the second polarized light is emitted from the second polarization controller PC2. Alternatively, the transmission axis of the polarizer PL8 may be parallel to the polarization direction of the transmitted light 302B when the transmitted light 302B enters the second polarization controller PC2.

The transmission axis of the polarizer PL1 is parallel to the transmission axis of the polarizer PL7, for example. When a retardation plate which imparts retardation to the emission light 303A is arranged between the polarizer PL1 and the polarizer PL7, the transmission axis of the polarizer PL1 intersects the transmission axis of the polarizer PL7. For example, the transmission axis of the polarizer PL2 is intersecting the transmission axis of the polarizer PL1, and the display panel PNL1 corresponds to a liquid crystal display panel of the so-called normally black mode which is configured to display an image when a voltage is applied to a pixel. More specifically, the transmission axis of the polarizer PL2 is orthogonal to the transmission axis of the polarizer PL1.

The transmission axis of the polarizer PL3 is parallel to the transmission axis of the polarizer PL8, for example, and is intersecting the transmission axis of the polarizer PL4. More specifically, the transmission axis of the polarizer PL3 is orthogonal to the transmission axis of the polarizer PL4. When each of the display panels PNL1 and PNL2 corresponds to a liquid crystal display panel of the normally black mode, the appearance of the projection plane 11 when an optical image is not projected onto the projection plane 11 can be improved. Note that one of the polarizers PL7 and PL1 may be omitted, and one of the polarizers PL8 and PL3 may be omitted.

Also in this modification, advantages similar to those described above can be obtained. Also, according to the display device 10 of the present modification, when one of the first optical image and the second optical image is projected, and the remaining one is not projected, light, which is incident on the optical modulation unit corresponding to the optical image not to be projected, can be interrupted. Accordingly, when the optical image is not projected, it is possible to suppress radiation of undesired light from the illumination device IL to the projection plane 11.

According to a structure in which the transmission axis of the polarizer PL7 intersects the first polarized light, or a structure in which the transmission axis of the polarizer PL8 intersects the second polarized light, for example, a user who uses polarized glasses can visually recognize either type of light since the first image 305A and the second image 305B are both converted into polarized light whose oscillation plane is nonparallel to an absorption axis of the polarized glasses, or circularly polarized light.

Figure 15B:
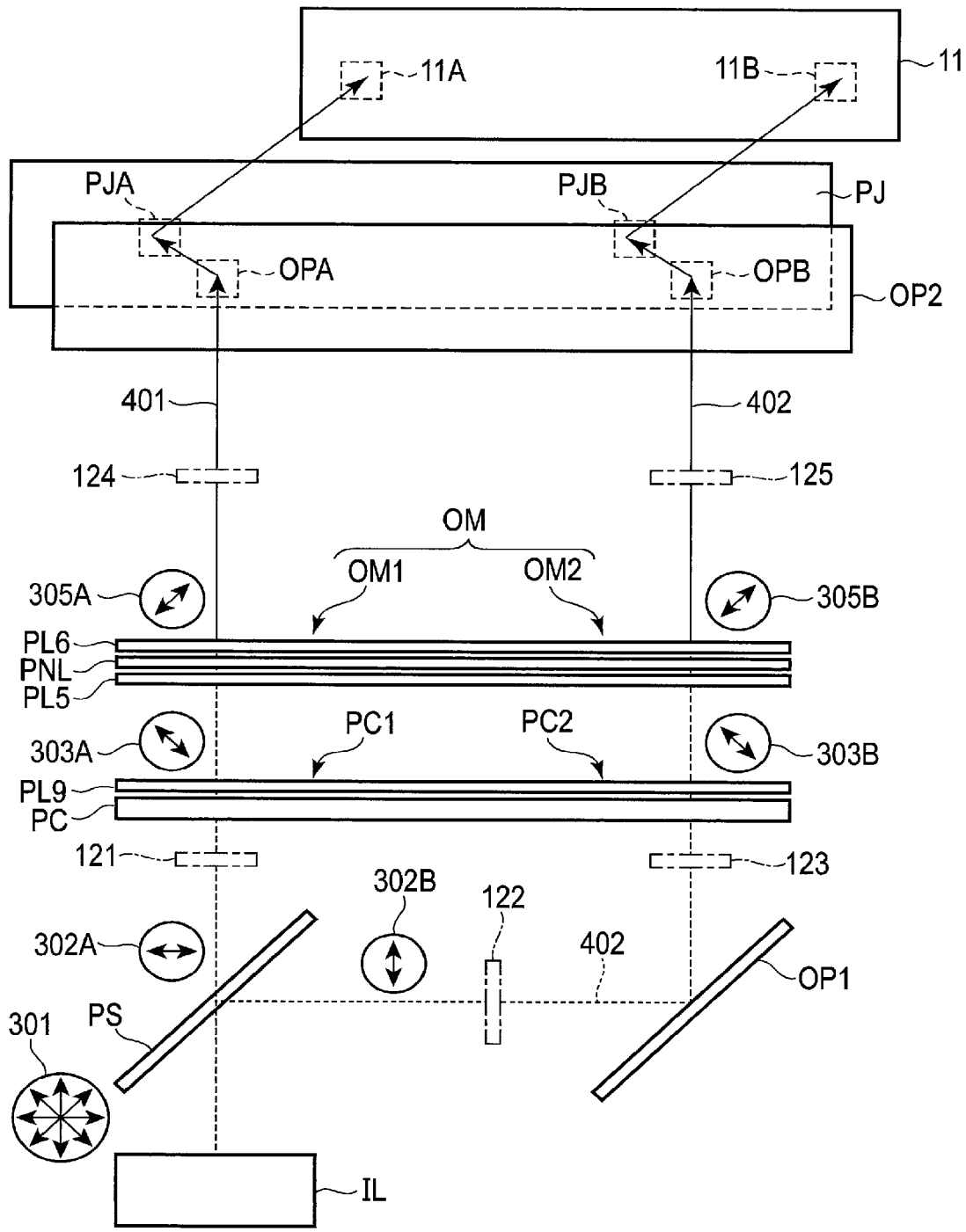
FIG. 15B is an illustration showing another modification of the display device 10 comprising the first polarization controller PC1 and the second polarization controller PC2.

FIG. 15B is an illustration showing another modification of the display device 10 comprising the first polarization controller PC1 and the second polarization controller PC2.

In the present modification, a single optical modulation element OM, which is continuous over the first optical path 401 and the second optical path 402, is arranged between the polarization separation element PS and the projector PJ. Each of the first optical modulation unit OM1 and the second optical modulation unit OM2 corresponds to a part of a single liquid crystal display element, and the structure illustrated in FIG. 8 can be applied. More specifically, the display panel PNL, the polarizer PL5, and the polarizer PL6, which are individual elements, constitute each of the first optical modulation unit OM1 and the second optical modulation unit OM2, and are arranged to be continuous over the first optical path 401 and the second optical path 402.

Each of the first polarization controller PC1 and the second polarization controller PC2 corresponds to a part of a polarization control element PC, which is a single liquid crystal element. The polarization control element PC is arranged to be continuous over the first optical path 401 and the second optical path 402 between the polarization separation element PS and the display panel PNL. The first polarization controller PC1 and the second polarization controller PC2 are formed in areas of the polarization control element PC which are opposed to the first optical modulation unit OM1 and the second optical modulation unit OM2, respectively, for example.

A single polarizer PL9, which is continuous over the first optical path 401 and the second optical path 402, is arranged between the polarization control element PC and the display panel PNL. A transmission axis of the polarizer PL9 is parallel to a transmission axis of the polarizer PL5. One of the polarizer PL9 and the polarizer PL5 may be omitted. The emission light 303A incident on the optical modulation unit OM1, and the emission light 303B incident on the second optical modulation unit OM2 are those which have been transmitted through the polarizer PL9. Accordingly, the polarization states of the emission light 303A and 303B are equal to each other, and the emission light 303A and 303B are the third polarized light, for example. The first image 305A displayed on the first optical modulation unit OM1, and the second image 305B displayed on the second optical modulation unit OM2 are those formed by light which have been transmitted through the polarizer PL6. Thus, the polarization states of the first image 303A and the second image 303B are equal to each other. By this feature, a difference in the display quality between the first optical image and the second optical image caused by the polarization dependence of the reflectance at the projection plane 11, for example, can be suppressed.

According to the present modification, since each of the optical modulation element OM and the polarization control element PC can be structured by a single element, the display device 10 can be made small.

Next, a configuration example of the first polarization controller PC1 which is applicable to the present embodiment will be described. It is assumed that the second polarization controller PC2 has a similar structure.

Figure 16:
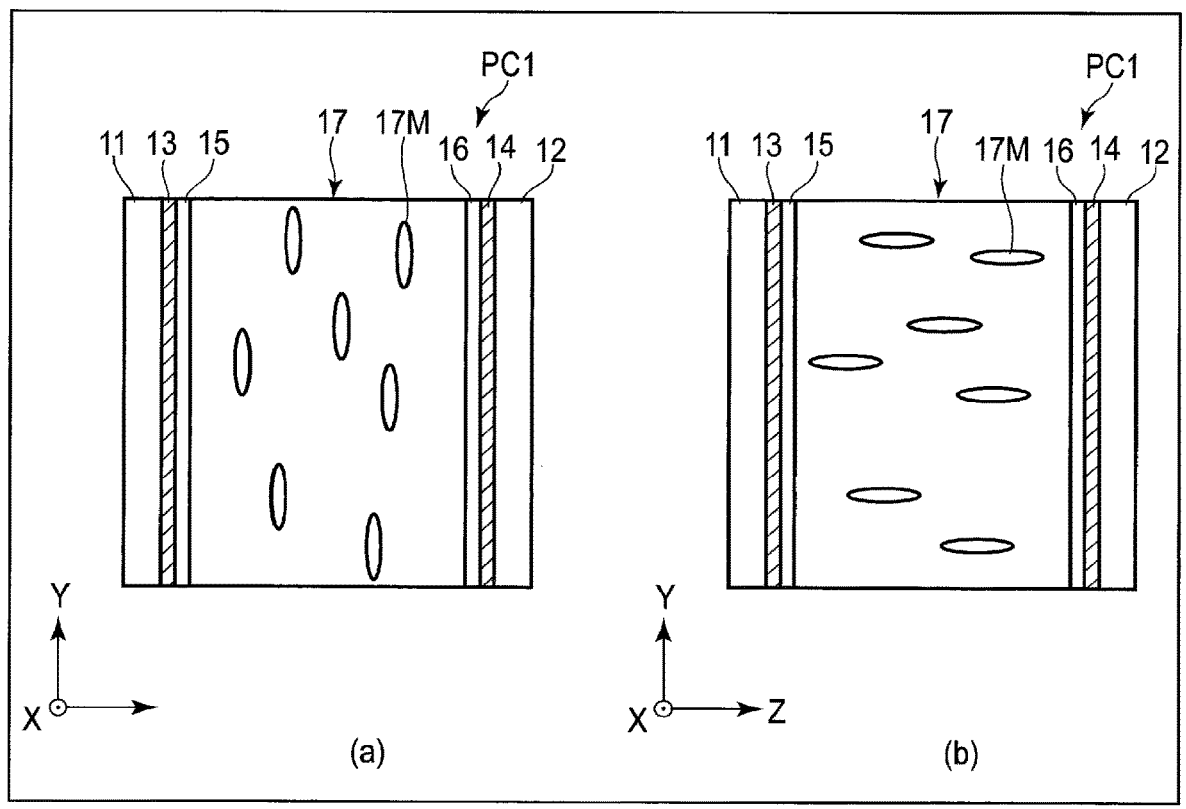
FIG. 16 is an illustration showing a configuration example of the first polarization controller PC1.

FIG. 16 is an illustration showing a configuration example of the first polarization controller PC1.

FIG. 16(a) is a cross-sectional view of the first polarization controller PC1 controlled in a first mode, and FIG. 16(b) is a cross-sectional view of the first polarization controller PC1 controlled in a second mode.

The first polarization controller PC1 comprises support substrates 11 and 12, a control electrode (a first electrode) 13, a control electrode (a second electrode) 14, alignment films 15 and 16, and a liquid crystal layer 17. The control electrode 13 is located between the support substrate 11 and the alignment film 15, and the control electrode 14 is located between the support substrate 12 and the alignment film 16. The liquid crystal layer 17 is located between the alignment films 15 and 16, in other words, between the control electrodes 13 and 14. Each of the support substrates 11 and 12 is a substrate which is transparent to visible light such as a glass substrate or a resin substrate. The control electrodes 13 and 14 are formed of a transparent conductive material such as ITO or IZO. The liquid crystal layer 17 includes liquid crystal molecules 17M of a nematic liquid crystal, for example. Note that as the liquid crystal layer 17, either a structure having positive dielectric anisotropy or a structure having negative dielectric anisotropy can be applied. As the alignment films 15 and 16, a horizontal alignment film having the alignment restriction force of aligning the liquid crystal molecules 17M in a direction parallel to a main surface, or a vertical alignment film having the alignment restriction force of aligning the liquid crystal molecules 17M in a direction parallel to a normal of the main surface may be applied.

In the first mode shown in FIG. 16(a), the liquid crystal molecules 17M are aligned in such a direction that their major axes are parallel to the main surface (in other words, the X-Y plane). In this case, retardation which is imparted to light transmitted through the liquid crystal layer 17 along the third direction Z is, for example, $\lambda/2$, and linearly polarized light transmitted through the liquid crystal layer 17 is converted into linearly polarized light in the polarization state of having the polarization axis rotated by 90 degrees in the X-Y plane.

In the second mode shown in FIG. 16(b), the liquid crystal molecules 17M are aligned in such a direction that their major axes are parallel to the third direction Z. In this case, retardation which is imparted to the light transmitted through the liquid crystal layer 17 along the third direction Z is zero, and the linearly polarized light transmitted through the liquid crystal layer 17 maintains its polarization state.

FIG. 17 is a plan view showing a configuration example of the first polarization controller PC1.

The first polarization controller PC1 includes an emission area SA in the X-Y plane. In one example, the emission area SA is formed in a rectangular shape having short sides along the first direction X and long sides along the second direction Y. However, the shape is not limited to the illustrated example, and the emission area SA may be formed in the other polygonal shape, or formed to be circular or elliptical, for example. Such an emission area SA is configured to emit the transmitted light 302A from the illumination device IL as the emission light 303A while maintaining or changing the polarization state, as described above.

In the configuration example illustrated in FIG. 17(a), each of the control electrodes 13 and 14 is constituted of a single sheet electrode extending over the entire surface of the emission area SA without having discontinuity. As described above, the control electrodes 13 and 14 are opposed to each other with the liquid crystal layer 17 interposed between the control electrodes 13 and 14. A driver DRA is electrically connected to each of the control electrodes 13 and 14. In such a configuration example, as the driver DRA controls a voltage to be applied to the control electrodes 13 and 14, the alignment direction of the liquid crystal molecules 17M of the liquid crystal layer 17 is controlled on the entire surface of the emission area SA. Thereby, the first polarization controller PC1 can control the mode between the first mode (i.e., a mode in which light is emitted by changing the polarization state mainly) and the second mode (i.e., a mode in which light is emitted by maintaining the polarization state mainly) on the entire surface of the emission area SA.

The configuration example shown in FIG. 17(b) is different from the configuration example shown in FIG. 17(a) in that the emission area SA includes strip-shaped sub-emission areas SA10. The control electrode 13 is constituted of a single sheet electrode as in the configuration example illustrated in FIG. 17(a). The control electrode 14 is constituted of strip electrodes 141 to 147 spaced apart from each other. In the example illustrated, the strip electrodes 141 to 147 are each formed in a rectangular shape extending in the first direction X, and are arranged to be spaced apart from each other in the second direction Y. The control electrode 13 and the strip electrodes 141 to 147 are opposed to each other. The driver DRA is electrically connected to the control electrode 13, and also to each of the strip electrodes 141 to 147. Each of the sub-emission areas SA10 corresponds to an overlapping portion where the control electrode 13 and one of the strip electrodes 141 to 147 overlap each other in the X-Y plane. In other words, in the example illustrated, each sub-emission area SA10 is a strip-shaped area extending in the first direction X.

Note that the strip electrodes 141 to 147 may each extend in the second direction Y, and be arranged to be spaced apart from each other in the first direction X. Further, the configuration example illustrated in the drawing corresponds to a case where one of the control electrodes 13 and 14 is constituted of a sheet electrode, and the other control electrode is constituted of strip electrodes. That is, the control electrode 13 may alternatively be constituted of a plurality of strip electrodes, and the control electrode 14 may be constituted of a single sheet electrode.

In such a configuration example, as the driver DRA controls a voltage to be applied to each of the strip electrodes 141 to 147, the alignment direction of the liquid crystal molecules 17M is controlled in each of the sub-emission areas SA10. In this way, the first polarization controller PC1 can control the mode between the first mode and the second mode for each of the sub-emission areas SA10. Note that in the first polarization controller PC1 of this configuration example, by driving all of the strip electrodes 141 to 147 together, control of the mode between the first mode and the second mode can be performed on the entire surface of the emission area SA.

The configuration example shown in FIG. 17(c) is different from the configuration example shown in FIG. 17(a) in that the emission area SA includes the sub-emission areas SA10 arranged in a matrix. The control electrode 13 is constituted of strip electrodes 131 to 135 which are spaced apart from each other. The control electrode 14 is constituted of strip electrodes 141 to 146 which are spaced apart from each other. In the example illustrated, the strip electrodes 131 to 135 each extend in the second direction Y, and are spaced apart from each other in the first direction X. Also, the strip electrodes 141 to 146 each extend in the first direction X, and are spaced apart from each other in the second direction Y. The strip electrodes 131 to 135 and the strip electrodes 141 to 146 are opposed to each other. The driver DRA is electrically connected to each of the strip electrodes 131 to 135 and each of the strip electrodes 141 to 146. Each of the sub-emission areas SA10 corresponds to a rectangular crossover portion where one of the strip electrodes 131 to 135 and one of the strip electrodes 141 to 146 cross each other in the X-Y plane. In other words, in the example illustrated, the sub-emission areas SA10 are arranged in a matrix in the first direction X and the second direction Y.

In such a configuration example, as the driver DRA controls a voltage to be applied to each of the strip electrodes 131 to 135 and the strip electrodes 141 to 146, the alignment direction of the liquid crystal molecules 17M is controlled in each of the sub-emission areas SA10. In this way, the first polarization controller PC1 can control the mode between the first mode and the second mode for each of the sub-emission areas SA10. Note that in the first polarization controller PC1 of this configuration example, by driving all of the strip electrodes 131 to 135 and the strip electrodes 141 to 146 together, control of the mode between the first mode and the second mode can be performed on the entire surface of the emission area SA.

In each of the above configuration examples, the shape of the sub-emission area SA10 is not limited to a rectangle. That is, the sub-emission area SA10 may be formed in an arbitrary shape such as a polygonal shape other than the above or a circular or elliptical shape. The shapes of the control electrodes 13 and 14 which define the shape of such a sub-emission area SA10 can be selected freely. The number of strip electrodes which constitute the control electrodes 13 and 14 is not limited to that of the example illustrated.

Modification 1 of Local Dimming Control

Next, local dimming control of a modification comprising the first polarization controller PC1 and the second polarization controller PC2 will be described.

Figure 18:
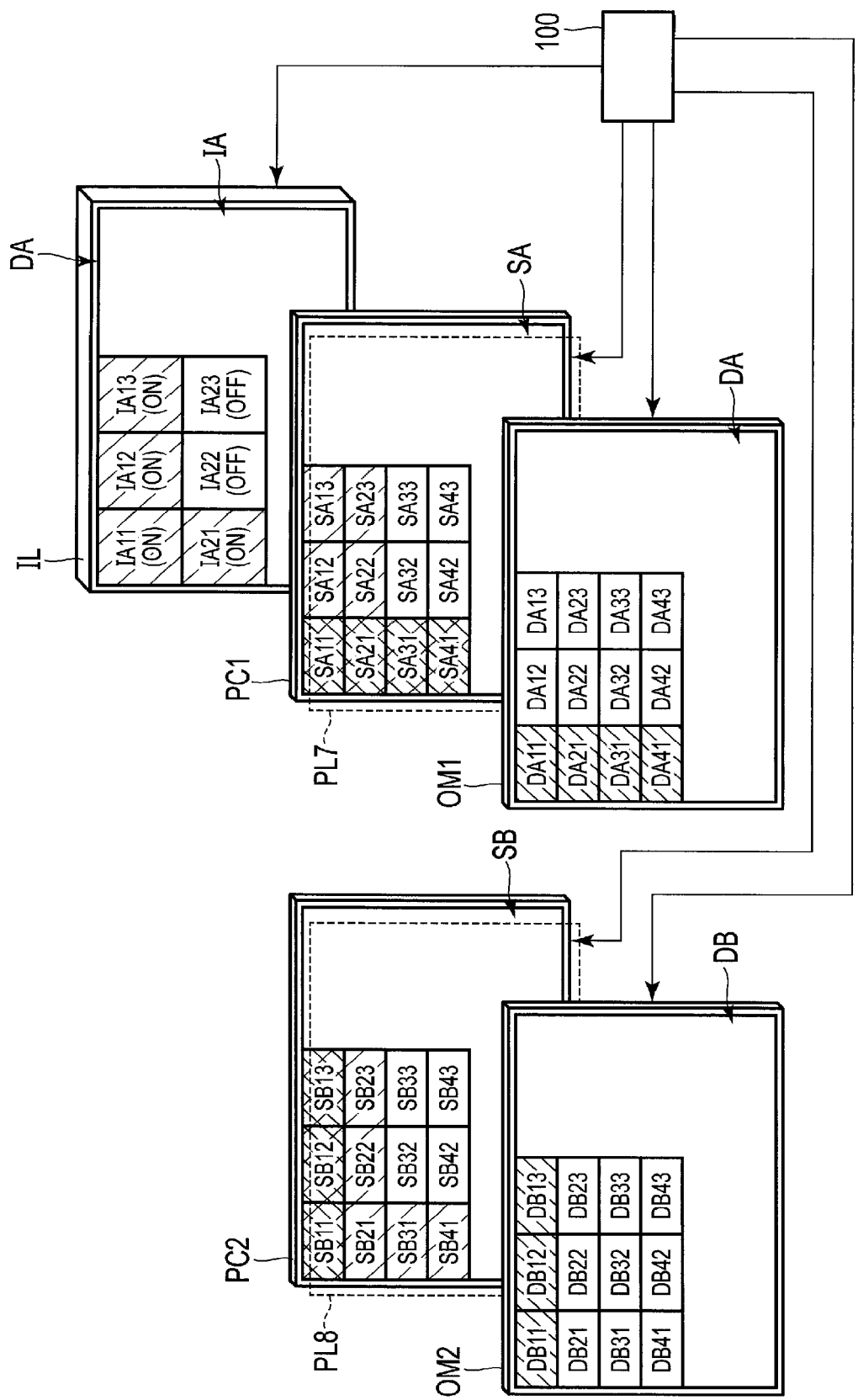
FIG. 18 is an illustration showing a configuration example of the display device 10 illustrated in FIG. 15A to which the local dimming control is applied.

FIG. 18 is an illustration showing a configuration example of the display device 10 illustrated in FIG. 15A to which the local dimming control is applied.

For example, the number of sub-display areas is equal to the number of sub-emission areas, and is greater than that of sub-illumination areas. In other words, the area of the sub-display area is equal to the area of the sub-emission area, and is smaller than the area of the sub-illumination area. Accordingly, by controlling the first polarization controller PC1 and the second polarization controller PC2 in synchronization with the illumination device IL, local dimming of higher definition as compared to local dimming depending on the illumination device IL alone can be achieved.

The illumination device IL comprises the sub-illumination areas IA11, IA12, IA13, IA21, IA22, and IA23.

The first polarization controller PC1 includes sub-emission areas SA11 and SA21 corresponding to the sub-illumination area IA11, sub-emission areas SA12 and SA22 corresponding to the sub-illumination area IA12, sub-emission areas SA13 and SA23 corresponding to the sub-illumination area IA13, sub-emission areas SA31 and SA41 corresponding to the sub-illumination area IA21, sub-emission areas SA32 and SA42 corresponding to the sub-illumination area IA22, and sub-emission areas SA33 and SA43 corresponding to the sub-illumination area IA23. In the above, what is meant by the sub-emission area of the first polarization controller PC1 corresponding to the sub-illumination area is that the sub-emission area emits sub-emission light by using sub-transmitted light from the sub-illumination area.

The second polarization controller PC2 includes sub-emission areas SB11 and SB21 corresponding to the sub-illumination area IA11, sub-emission areas SB12 and SB22 corresponding to the sub-illumination area IA12, sub-emission areas SB13 and SB23 corresponding to the sub-illumination area IA13, sub-emission areas SB31 and SB41 corresponding to the sub-illumination area IA21, sub-emission areas SB32 and SB42 corresponding to the sub-illumination area IA22, and sub-emission areas SB33 and SB43 corresponding to the sub-illumination area IA23. In the above, what is meant by the sub-emission area of the second polarization controller PC2 corresponding to the sub-illumination area is that the sub-emission area emits sub-emission light by using sub-reflected light from the sub-illumination area.

The first optical modulation unit OM1 includes the sub-display areas DA11 to DA43 corresponding to the sub-emission areas SA11 to SA43, respectively. The second optical modulation unit OM2 includes the sub-display areas DB11 to DB43 corresponding to the sub-emission areas SB11 to SB43, respectively. What is meant by the sub-display area corresponding to the sub-emission area is that the sub-display area displays a sub-image by using the sub-emission light from the sub-emission area.

The main controller 100 controls the first optical modulation unit OM1 to display the first image in the display area DA, and controls the second optical modulation unit OM2 to display the second image in the display area DB. Also, the main controller 100 controls the illumination device IL, the first polarization controller PC1, and the second polarization controller PC2, in synchronization with display of the images on the first optical modulation unit OM1 and the second optical modulation unit OM2. Hereinafter, an example of control of the illumination device IL, the first polarization controller PC1, and the second polarization controller PC2 will be described.

The main controller 100 selects between lighting and turning off of the light for the corresponding sub-illumination area based on the respective gradation values of the first image and the second image, determines the brightness of the sub-illumination area to be lit (i.e., the current value of the light source provided in the sub-illumination area), and drives the illumination device IL. Also, in synchronization with control of the illumination device IL, the main controller 100 determines the polarization state of the sub-emission light of the corresponding sub-emission area based on the respective gradation values of the first image and the second image, and drives the first polarization controller PC1 and the second polarization controller PC2.

In the example illustrated, in the display area DA, the first sub-images are displayed in the sub-display areas DA11, DA21, DA31, and DA41, and are not displayed in the sub-display areas DA12, DA13, DA22, DA23, DA32, DA33, DA42, and DA43. In the display area DB, the second sub-images are displayed in the sub-display areas DB11, DB12, and DB13, and are not displayed in the sub-display areas DB21, DB22, DB23, DB31, DB32, DB33, DB41, DB42, and DB43. At this time, the light is turned off in the sub-illumination areas IA22 and IA23 (OFF).

As a result of comparison between the first sub-images displayed in the sub-display areas DA11 and DA21 and the second sub-image displayed in the sub-display area DB11, the sub-illumination area IA11 is lit based on the sub-image displayed at a higher brightness level (ON). The sub-emission areas SA11, SA21, and SB11 control the polarization state and emit the sub-emission light such that each of the sub-emission light incident on the sub-display areas DA11, DA21, and DB11 has desired brightness. The brightness of the sub-emission light incident on the sub-display area is determined by the polarization state of the sub-emission light emitted from the sub-emission area, and the transmission axis of the polarizer PL7 or PL8. The sub-emission area SB21 emits the sub-emission light as the linearly polarized light orthogonal to the transmission axis of the polarizer PL8. In this way, the sub-display areas DA11, DA21, and DB11 are illuminated at desired brightness, and illumination in the sub-display area DB21 is interrupted.

The sub-illumination areas IA12 and IA13 are lit based on the brightness levels of the second sub-images displayed in the sub-display areas DB12 and DB13, respectively (ON). Each of the sub-emission areas SB12 and SB13 emits the sub-emission light as the linearly polarized light parallel to the transmission axis of the polarizer PL8, for example. Each of the sub-emission areas SB22 and SB23 emits the sub-emission light as the linearly polarized light orthogonal to the transmission axis of the polarizer PL8. Each of the sub-emission areas SA12, SA13, SA22, and SA23 emits the sub-emission light as the linearly polarized light orthogonal to the transmission axis of the polarizer PL7. In this way, the sub-display areas DB12 and DB13 are illuminated at desired brightness, and illumination in the sub-display areas DB22, DB23, DA12, DA13, DA22, and DA23 is interrupted.

The sub-illumination area IA21 is lit based on brightness of the sub-display areas DA31 and DA41 (ON). Each of the sub-emission areas SA31 and SA41 emits the sub-emission light as the linearly polarized light parallel to the transmission axis of the polarizer PL7, for example. Each of the sub-emission areas SB31 and SB41 emits the sub-emission light as the linearly polarized light orthogonal to the transmission axis of the polarizer PL8. In this way, the sub-display areas DA31 and DA41 are illuminated at desired brightness, and illumination in the sub-display areas DB31 and DB41 is interrupted.

According to the display device 10 described above, deterioration in display quality and reduction of the contrast ratio that are caused by leakage of light from the sub-display areas which do not display the sub-images can be suppressed.

Figure 19:
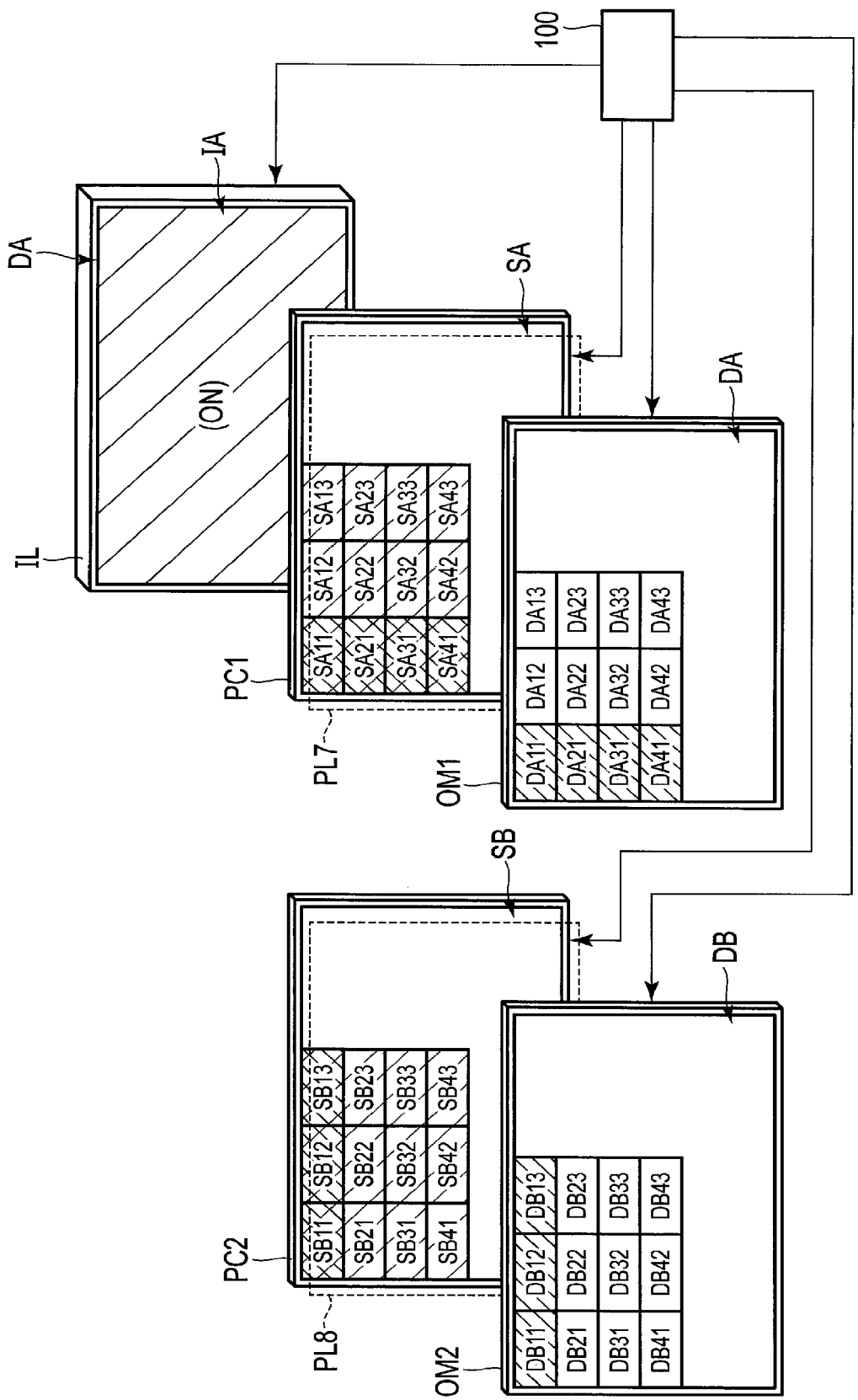
FIG. 19 is an illustration showing a modification of the display device 10 shown in FIG. 18.

FIG. 19 is an illustration showing a modification of the display device 10 shown in FIG. 18.

The present modification is different from the configuration example illustrated in FIG. 18 in that the illumination area IA is not divided.

Also in the present modification, the brightness of the sub-emission light incident on each of the sub-display areas DA11 to DA43 and DB11 to DB43 can be controlled by the first polarization controller PC1 and the second polarization controller PC2. More specifically, as the main controller 100 controls the first polarization controller PC1 and the second polarization controller PC2 in synchronization with display of the first image and the second image, it is possible to obtain display quality similar to that of the local dimming in which the illumination device IL is divided, and lighting and turning off of the light is performed in each of the divided areas. Also in this modification, advantages similar to those described above can be obtained.

As described above, according to the present embodiment, a display device capable of displaying various images while reducing the amount of heat generation can be provided.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A display device comprising:
    a polarization separation element configured to transmit first polarized light as transmitted light, and reflect second polarized light different from the first polarized light as reflected light, the first polarized light and the second polarized light being part of illumination light from an illumination device;
    a first optical modulation unit including a liquid crystal layer and configured to display a first image by using the transmitted light;
    a second optical modulation unit including a liquid crystal layer and configured to display a second image by using the reflected light; and
    a retardation plate configured to impart retardation to at least one of the transmitted light and the reflected light,
    wherein the retardation plate is configured to change the reflected light from the second polarized light to the first polarized light.

2. The display device according to claim 1,
    wherein the retardation plate is arranged between the polarization separation element and the second optical modulation unit.

3. The display device according to claim 1,
    wherein the retardation plate is configured to impart retardation to the reflected light through the second optical modulation unit.

4. The display device according to claim 1,
    wherein the first image is projected onto a first projection area, and the second image is projected onto a second projection area different from the first projection area.

5. The display device according to claim 1,
    further comprising a mirror configured to reflect the reflected light from the polarization separation element to the second optical modulation unit.

6. The display device according to claim 1,
    wherein an optical path length from the illumination device to the first optical modulation unit is different from an optical path length from the illumination device to the second optical modulation unit.

7. The display device according to claim 1,
    wherein the retardation plate is configured to change the reflected light from the second polarized light to the first polarized light.

8. The display device according to claim 1,
    wherein the retardation plate is configured to change the transmitted light from the first polarized light to the second polarized light.

9. The display device according to claim 1,
    wherein the retardation plate is configured to change at least one of the transmitted light and the reflected light to third polarized light different from the first polarized light and the second polarized light.

10. The display device according to claim 1,
    wherein the retardation plate is arranged in at least one point between the polarization separation element and the first area of the optical modulation unit, and between the polarization separation element and the second area of the optical modulation unit.

11. The display device according to claim 1,
    wherein the retardation plate is configured to impart retardation to at least one of the transmitted light through the first area of the optical modulation unit and the reflected light through the second area of the optical modulation unit.

12. The display device according to claim 1,
    wherein the first image is projected onto a first projection area, and the second image is projected onto a second projection area different from the first projection area.

13. The display device according to claim 1,
    further comprising a mirror configured to reflect the reflected light from the polarization separation element to the second area of the optical modulation unit.

14. The display device according to claim 1,
    wherein an optical path length from the illumination device to the first area of the optical modulation unit is different from an optical path length from the illumination device to the second area of the optical modulation unit.

15. A display device comprising:
    a polarization separation element configured to
        transmit first polarized light as transmitted light, and
        reflect second polarized light different from the first polarized light as reflected light,
        the first polarized light and the second polarized light being part of illumination light from an illumination device;
    a first optical modulation unit including a liquid crystal layer and configured to display a first image by using the transmitted light;
    a second optical modulation unit including a liquid crystal layer and configured to display a second image by using the reflected light; and
    a retardation plate configured to impart retardation to at least one of the transmitted light and the reflected light,
    wherein the retardation plate is configured to change the transmitted light from the first polarized light to the second polarized light.

16. The display device according to claim 15,
    wherein the retardation plate is configured to impart retardation to the transmitted light through the first optical modulation unit.

17. A display device comprising:
    a polarization separation element configured to
        transmit first polarized light as transmitted light, and
        reflect second polarized light different from the first polarized light as reflected light,
        the first polarized light and the second polarized light being part of illumination light from an illumination device;
    a first optical modulation unit including a liquid crystal layer and configured to display a first image by using the transmitted light;

a second optical modulation unit including a liquid crystal layer and configured to display a second image by using the reflected light; and a retardation plate configured to impart retardation to at least one of the transmitted light and the reflected light, wherein the retardation plate is configured to change at least one of the transmitted light and the reflected light to third polarized light different from the first polarized light and the second polarized light.

18. The display device according to claim 17, wherein the retardation plate is arranged in at least one point between the polarization separation element and the first optical modulation unit, and between the polarization separation element and the second optical modulation unit.

19. The display device according to claim 17, wherein the retardation plate is configured to impart retardation to at least one of the transmitted light through the first optical modulation unit and the reflected light through the second optical modulation unit.

20. A display device comprising: a polarization separation element configured to transmit first polarized light as transmitted light, and reflect second polarized light different from the first polarized light as reflected light, the first polarized light and the second polarized light being part of illumination light from an illumination device; an optical modulation unit including a liquid crystal layer and having a first area and a second area, the first area configured to display a first image by using the transmitted light, and the second area configured to display a second image by using the reflected light; and a retardation plate configured to impart retardation to at least one of the transmitted light and the reflected light.

* * * * *